United States Patent
Ketchum et al.

(10) Patent No.: US 8,600,297 B2
(45) Date of Patent: Dec. 3, 2013

(54) METHOD AND SYSTEM FOR FEMTO CELL SELF-TIMING AND SELF-LOCATING

(75) Inventors: John W. Ketchum, Harvard, MA (US); Srinath Nagaraj, San Diego, CA (US); Ashok Bhatia, San Diego, CA (US); Eric J. Katzfey, Encinitas, CA (US); Lalitaprasad V. Daita, San Jose, CA (US); Sekharjyoti Baruah, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 387 days.

(21) Appl. No.: 12/510,916

(22) Filed: Jul. 28, 2009

(65) Prior Publication Data

US 2011/0028166 A1 Feb. 3, 2011

(51) Int. Cl.
*H04B 7/19* (2006.01)

(52) U.S. Cl.
USPC .......................... 455/13.2; 455/12.1; 455/502

(58) Field of Classification Search
USPC ........... 455/502, 12.1, 13.2; 370/395.62, 503, 370/518
See application file for complete search history.

(56) References Cited

U.S. PATENT DOCUMENTS

| | | | |
|---|---|---|---|
| 4,112,421 A | 9/1978 | Freeny, Jr. | |
| 4,567,483 A | 1/1986 | Bateman et al. | |
| 5,075,693 A | 12/1991 | McMillan et al. | |
| 5,515,419 A | 5/1996 | Sheffer | |
| 5,537,460 A | 7/1996 | Holliday, Jr. et al. | |
| 5,570,412 A | 10/1996 | LeBlanc | |
| 5,588,848 A | 12/1996 | Law et al. | |
| 5,608,410 A | 3/1997 | Stilp et al. | |
| 5,613,205 A | 3/1997 | Dufour | |
| 5,657,487 A | 8/1997 | Doner | |
| 5,706,333 A | 1/1998 | Grenning et al. | |
| 5,717,406 A | 2/1998 | Sanderford et al. | |
| 5,731,786 A | 3/1998 | Abraham et al. | |
| 5,736,957 A | 4/1998 | Raney | |
| 5,812,087 A | 9/1998 | Krasner | |
| 5,841,396 A | 11/1998 | Krasner | |
| 5,873,040 A | 2/1999 | Dunn et al. | |
| 5,874,914 A | 2/1999 | Krasner | |
| 5,883,598 A | 3/1999 | Parl et al. | |

(Continued)

FOREIGN PATENT DOCUMENTS

CN 101218810 A 7/2008
CN 101238642 A 8/2008

(Continued)

OTHER PUBLICATIONS

International Search Report & Written Opinion—PCT/US2009/062875-.

(Continued)

*Primary Examiner* — Barry Taylor

(57) ABSTRACT

Devices and methods are provided for providing self-timing and self-locating in an access point (AP) base station. In one embodiment, the method involves receiving Satellite Positioning System (SPS) signals from a first data source (e.g., plurality of satellites), wherein the SPS signals may include SPS time data, SPS frequency data, and SPS position data. The method may further involve obtaining from a second data source (e.g., cell site, terrestrial navigation station, server, user input interface, etc.) at least one of second time data, second frequency data and second position data, and determining relative reliability of the first and second data sources.

72 Claims, 19 Drawing Sheets

(56) References Cited

U.S. PATENT DOCUMENTS

| | | |
|---|---|---|
| 5,945,944 A | 8/1999 | Krasner |
| 5,960,341 A | 9/1999 | LeBlanc et al. |
| 5,969,669 A | 10/1999 | Ishikawa et al. |
| 5,987,306 A | 11/1999 | Nilsen et al. |
| 5,999,124 A | 12/1999 | Sheynblat |
| 6,014,102 A | 1/2000 | Mitzlaff et al. |
| 6,061,018 A | 5/2000 | Sheynblat |
| 6,122,266 A | 9/2000 | Lynch |
| 6,128,501 A | 10/2000 | Ffoulkes-Jones |
| 6,161,018 A | 12/2000 | Reed et al. |
| 6,166,685 A | 12/2000 | Soliman |
| 6,167,275 A | 12/2000 | Oros et al. |
| 6,175,500 B1 | 1/2001 | Roy |
| 6,188,354 B1 | 2/2001 | Soliman et al. |
| 6,208,290 B1 | 3/2001 | Krasner |
| 6,215,441 B1 | 4/2001 | Moeglein et al. |
| 6,215,442 B1 | 4/2001 | Sheynblat et al. |
| 6,216,064 B1 | 4/2001 | Johnson et al. |
| 6,222,483 B1 | 4/2001 | Twitchell et al. |
| 6,230,018 B1 | 5/2001 | Watters et al. |
| 6,236,365 B1 | 5/2001 | LeBlanc et al. |
| 6,243,587 B1 | 6/2001 | Dent et al. |
| 6,243,591 B1 | 6/2001 | Takemura |
| 6,246,861 B1 | 6/2001 | Messier et al. |
| 6,249,252 B1 | 6/2001 | Dupray |
| 6,263,208 B1 | 7/2001 | Chang et al. |
| 6,275,707 B1 | 8/2001 | Reed et al. |
| 6,313,786 B1 | 11/2001 | Sheynblat et al. |
| 6,313,787 B1 | 11/2001 | King et al. |
| 6,314,294 B1 | 11/2001 | Benveniste |
| 6,330,628 B1 | 12/2001 | Motoyama |
| 6,353,412 B1 | 3/2002 | Soliman |
| 6,362,778 B2 | 3/2002 | Neher |
| 6,393,294 B1 | 5/2002 | Perez-Breva et al. |
| 6,433,735 B1 | 8/2002 | Bloebaum et al. |
| 6,438,382 B1 | 8/2002 | Boesch et al. |
| 6,445,927 B1 | 9/2002 | King et al. |
| 6,466,797 B1 | 10/2002 | Frodigh et al. |
| 6,466,938 B1 | 10/2002 | Goldberg |
| 6,490,313 B1 | 12/2002 | Ganesh et al. |
| 6,501,955 B1 | 12/2002 | Durrant et al. |
| 6,526,039 B1 | 2/2003 | Dahlman et al. |
| 6,529,164 B1 | 3/2003 | Carter |
| 6,538,601 B2 | 3/2003 | Bruno et al. |
| 6,556,829 B1 | 4/2003 | Persson |
| 6,590,530 B2 | 7/2003 | Van Diggelen et al. |
| 6,603,966 B1 | 8/2003 | Sheffield |
| 6,628,944 B1 | 9/2003 | Jeong et al. |
| 6,636,740 B1 | 10/2003 | Ramesh |
| 6,636,744 B1 | 10/2003 | Da |
| 6,684,158 B1 | 1/2004 | Garin et al. |
| 6,707,422 B2 | 3/2004 | Sheynblat et al. |
| 6,754,470 B2 | 6/2004 | Hendrickson et al. |
| 6,757,544 B2 | 6/2004 | Rangarajan et al. |
| 6,799,050 B1 | 9/2004 | Krasner |
| 6,799,054 B2 | 9/2004 | Shpak |
| 6,806,830 B2 | 10/2004 | Panasik et al. |
| 6,865,395 B2 | 3/2005 | Riley |
| 6,895,249 B2 | 5/2005 | Gaal |
| 6,898,197 B1 | 5/2005 | Lavean |
| 6,941,145 B2 | 9/2005 | Ogino et al. |
| 6,957,072 B2 | 10/2005 | Kangras et al. |
| 6,970,795 B1 | 11/2005 | Burgett et al. |
| 7,065,351 B2 | 6/2006 | Carter et al. |
| 7,072,316 B2 | 7/2006 | Proctor, Jr. et al. |
| 7,084,809 B2 | 8/2006 | Hockley, Jr. et al. |
| 7,123,928 B2 | 10/2006 | Moeglein et al. |
| 7,127,257 B2 | 10/2006 | Riley et al. |
| 7,203,497 B2 | 4/2007 | Belcea |
| 7,209,758 B1 | 4/2007 | Moll et al. |
| 7,239,272 B2 | 7/2007 | Vyas et al. |
| 7,286,515 B2 | 10/2007 | Olson et al. |
| 7,359,706 B2 | 4/2008 | Zhao |
| 7,363,028 B2 | 4/2008 | de Clerq et al. |
| 7,383,049 B2 | 6/2008 | Deloach, Jr. et al. |
| 7,558,852 B2 | 7/2009 | Douglas et al. |
| 7,660,588 B2 | 2/2010 | Sheynblat et al. |
| 7,684,473 B2 | 3/2010 | Walton et al. |
| 7,751,829 B2 | 7/2010 | Masuoka et al. |
| 7,821,986 B2 | 10/2010 | Thomson et al. |
| 7,860,527 B2 | 12/2010 | Ngai et al. |
| 7,936,736 B2 | 5/2011 | Proctor, Jr. et al. |
| 8,144,673 B2 | 3/2012 | Alizadeh-Shabdiz |
| 8,150,421 B2 | 4/2012 | Ward et al. |
| 8,204,512 B2 | 6/2012 | Dietrich et al. |
| 8,244,274 B2 | 8/2012 | Grigsby et al. |
| 2001/0022558 A1 | 9/2001 | Karr, Jr. et al. |
| 2001/0034223 A1 | 10/2001 | Rieser et al. |
| 2001/0041566 A1 | 11/2001 | Xanthos et al. |
| 2002/0022482 A1 | 2/2002 | Ishikawa |
| 2002/0025822 A1 | 2/2002 | Hunzinger |
| 2002/0065107 A1 | 5/2002 | Harel et al. |
| 2002/0076951 A1 | 6/2002 | Roy |
| 2002/0076952 A1 | 6/2002 | Roy |
| 2002/0076958 A1 | 6/2002 | Roy et al. |
| 2002/0095486 A1 | 7/2002 | Bahl |
| 2002/0131255 A1 | 9/2002 | Roy |
| 2002/0137404 A1 | 9/2002 | Roy |
| 2002/0175855 A1 | 11/2002 | Richton et al. |
| 2002/0193946 A1* | 12/2002 | Turnbull ................. 701/219 |
| 2003/0007468 A1 | 1/2003 | Joshi et al. |
| 2003/0048758 A1 | 3/2003 | Jones et al. |
| 2003/0068977 A1* | 4/2003 | King ..................... 455/12.1 |
| 2003/0083064 A1 | 5/2003 | Cooper |
| 2003/0095527 A1 | 5/2003 | Shanbhag |
| 2003/0125045 A1 | 7/2003 | Riley et al. |
| 2003/0129987 A1 | 7/2003 | Tanay et al. |
| 2003/0134648 A1 | 7/2003 | Reed et al. |
| 2003/0190919 A1 | 10/2003 | Niemenmaa |
| 2003/0195008 A1 | 10/2003 | Mohi et al. |
| 2004/0034471 A1* | 2/2004 | Rorabaugh ............. 701/214 |
| 2004/0110518 A1 | 6/2004 | Swift et al. |
| 2004/0180670 A1 | 9/2004 | Pande et al. |
| 2004/0203727 A1 | 10/2004 | Abiri et al. |
| 2004/0263386 A1 | 12/2004 | King et al. |
| 2005/0070304 A1 | 3/2005 | Farchmin et al. |
| 2005/0090266 A1 | 4/2005 | Sheynblat |
| 2005/0113107 A1 | 5/2005 | Meunier |
| 2006/0030290 A1 | 2/2006 | Rudolf et al. |
| 2006/0211431 A1* | 9/2006 | Mansour et al. .......... 455/456.2 |
| 2006/0232466 A1* | 10/2006 | Park et al. ............. 342/357.07 |
| 2006/0276202 A1 | 12/2006 | Moeglein et al. |
| 2007/0042790 A1 | 2/2007 | Mohi et al. |
| 2007/0053474 A1* | 3/2007 | Kim ........................ 375/356 |
| 2007/0139267 A1 | 6/2007 | Black et al. |
| 2007/0258421 A1 | 11/2007 | Alizadeh-Shabdiz et al. |
| 2008/0008118 A1 | 1/2008 | Alizadeh-Shabdiz |
| 2008/0032706 A1 | 2/2008 | Sheynblat et al. |
| 2008/0096579 A1 | 4/2008 | Gill |
| 2008/0242312 A1 | 10/2008 | Paulson et al. |
| 2008/0280624 A1 | 11/2008 | Wrappe |
| 2008/0294334 A1* | 11/2008 | Jo et al. .................... 701/204 |
| 2009/0146870 A1 | 6/2009 | Thome et al. ............ 342/357.1 |
| 2009/0225743 A1* | 9/2009 | Nicholls et al. ............. 370/350 |
| 2010/0073229 A1* | 3/2010 | Pattabiraman et al. .. 342/357.09 |
| 2010/0093377 A1 | 4/2010 | Riley et al. |
| 2010/0099375 A1 | 4/2010 | Rowitch |
| 2011/0263219 A1 | 10/2011 | Hasenfang et al. |

FOREIGN PATENT DOCUMENTS

| | | |
|---|---|---|
| EP | 0930514 A2 | 7/1999 |
| EP | 1008862 A1 | 6/2000 |
| EP | 1122554 A1 | 8/2001 |
| EP | 2015535 A1 | 1/2009 |
| GB | 2364617 | 1/2002 |
| JP | 5336564 A | 12/1993 |
| JP | 8237729 | 9/1996 |
| JP | 9261159 A | 10/1997 |
| JP | 1070752 | 3/1998 |
| JP | 2001112050 A | 4/2001 |
| JP | 2002152104 | 5/2002 |
| JP | 2002518684 A | 6/2002 |
| JP | 2002300100 A | 10/2002 |

(56) References Cited

FOREIGN PATENT DOCUMENTS

| JP | 2003296152 A | 10/2003 |
|---|---|---|
| JP | 2004166056 A | 6/2004 |
| JP | 2005020053 A | 1/2005 |
| JP | 2005535901 T | 11/2005 |
| JP | 2007506099 A | 3/2007 |
| JP | 2008501260 A | 1/2008 |
| JP | 2009545752 | 12/2009 |
| KR | 1020050050641 | 5/2005 |
| WO | WO9603679 A1 | 2/1996 |
| WO | 9631076 | 10/1996 |
| WO | 9642179 A1 | 12/1996 |
| WO | WO9705722 A2 | 2/1997 |
| WO | 9944375 A1 | 9/1999 |
| WO | 0038460 A1 | 6/2000 |
| WO | 0133302 | 5/2001 |
| WO | WO0150151 A1 | 7/2001 |
| WO | 0173466 A1 | 10/2001 |
| WO | 0184862 | 11/2001 |
| WO | 0199444 A1 | 12/2001 |
| WO | 0223215 | 3/2002 |
| WO | 0251192 A1 | 6/2002 |
| WO | 03010552 A2 | 2/2003 |
| WO | 03019835 A1 | 3/2003 |
| WO | 03053986 A2 | 7/2003 |
| WO | WO2004102865 A1 | 11/2004 |
| WO | 2008016901 A2 | 2/2008 |
| WO | WO2009017877 | 2/2009 |

OTHER PUBLICATIONS

International Search Authority—European Patent Office—May 17, 2010.

TIA/856-A; "CDMA2000 High Rate Packet Data Air Interface Specification" (Apr. 2004).

TIA/EIA-95-B; Mobile Station-Base Station Compatibility Starndard for Wideband Spread Spectrum Cellular Systems (Mar. 1999).

3GPP2 C.S0010-C, "Recommended Minimum Performance Standards for cdma2000 Spread Spectrum Base Stations," version 1.0, Release C, Jan. 14, 2005.

3GPP2 C.S0010-C, "Recommended Minimum Performance Standards for cdma2000 Spread Spectrum Base Stations," version 2.0, Release C, Feb. 24, 2006.

3GPP2 C.S0022-0-1, Publication Version, Date: Feb. 16, 2001, 3rd Generation Partnership Project 2 (3GPP2), Position Determination Service Standard for Dual Mode Spread Spectrum Systems, Addendum (TIA/EIA/IS-801-1).

Biacs, et al., "The Qualcomm/Snaptrack Wireless-Assisted GPS Hybrid Positioning System and Reults from Initial Commercial Deployments" Proceedings of the Institute of Navigation, ION GPS 2002, Online, Sep. 24, 2002, pp. 378-384.

GSM 04.31, V8.1.0 (Apr. 2000), Digital Cellular Telecommunications System (Phase 2+); Location Services (LCS); Mobile Station (MS)—Serving Mobile Location Centre (SMLC) Radio Resource LCS Protocol (RRLP) (GSM 04.31 version 8.1.0 Release 1999).

Savarese C et al: "Locationing in distributed ad-hoc wireless sensor networks" 2001 IEEE International Conference on Acoustics, Speech, and Signal Processing. Proceedings. (ICASSP). Salt Lake City, UT, May 7-11, 2001, IEEE International Conference on Acoustics, Speech, and Signal Processing (ICASSP) New York, NY: IEEE, US, vol. 4 of 6, May 7, 2001, pp. 2037-2040, XP002225743 ISBN: 0-7803-7041-4.

Telecommunications Industry Association, Mobile Station-Base Station Compatibility Standard for Dual-Mode Wideband Spread Spectrum Cellular System, TIA/EIA-95, Jul. 1993, 668 pages.

TIA/EIA J-STD-036-A, "Enhanced Wireless 9 1 1, Phase 2", TIA: Published Jun. 2002.

TIA/EIA/IS-2000—Introduction to cdma2000 Standards for Spread Spectrum Systems; Physical Layer Standard for cdma2000 Spread Spectrum Systems; Medium Access Control (MAC) Standard for cdma2000 Spread Spectrum Systems; Signaling Link Access Control (LAC) Standard for cdma2000 Spread Spectrum Systems; Upper Layer (Layer 3) Signaling Standard for cdma2000 Spread Spectrum Systems; Analog Signaling Standard for cdma2000 Spread Spectrum Systems (V.1.0, Release C, May 28, 2002).

Taiwan Search Report—TW098136946—TIPO—May 21, 2013.

* cited by examiner

METHOD AND SYSTEM FOR FEMTO CELL SELF-TIMING AND SELF-LOCATING

BACKGROUND

1. Field

The present application relates generally to wireless communications, and more specifically to methods and systems for acquisition of time and location information by AP base stations.

2. Background

Wireless communication systems are widely deployed to provide various types of communication (e.g., voice, data, multimedia services, etc.) to multiple users. As the demand for high-rate and multimedia data services rapidly grows, there lies a challenge to implement efficient and robust communication systems with enhanced performance.

In recent years, users have started to replace fixed line communications with mobile communications and have increasingly demanded great voice quality, reliable service, and low prices. In addition to mobile phone networks currently in place, a new class of small base stations has emerged, which may be installed in residential or business locations to provide indoor wireless coverage to mobile units using existing broadband internet connections. Such personal miniature base stations are generally known as an access point (AP) base station, also referred to as Home Node B (HNB) unit, femto cell, femto base station (fBS), base station, or base station transceiver system (BTS). Typically, such miniature base stations are connected to the internet and the mobile operator's network via a digital subscriber line (DSL) router or cable modem.

AP base stations or femto cells allow for cellular access where base station support is weak or unavailable (e.g., indoors, remote locations, and the like). AP base stations may be described as small base stations that connect to wireless service providers via a broadband backhaul link, such as DSL, cable internet access, T1/T3, etc., and offer typical base station functionality, such as base transceiver station (BTS) technology, radio network controller, and gateway support node services. This allows an access terminal (AT), also referred to as a cellular/mobile device or handset, or user equipment (UE), to connect to the AP base stations and utilize the wireless service. It is noted that ATs can include, for example, cellular phones, smart phones, laptops, handheld communication devices, handheld computing devices, satellite radios, navigational devices, personal digital assistants (PDAs), and/or any other suitable device for communicating over a wireless communication system.

AP base stations generally need accurate time synchronization with the mobile operator's network, as well as accurate frequency reference for generation of radio frequency carrier and sampling clocks. AP base stations also need accurate information about their position in order to satisfy operational and regulatory requirements of the jurisdictions in which they operate, as well as to support location-based services provided by cellular networks. However, the acquisition of network time and frequency or position determination by AP base stations are often complicated by radio frequency (RF) isolation and/or hidden node issues associated with the deployment of AP base stations in residential and commercial environments, typically in the interior of buildings. Accordingly, it would be desirable to provide a technique for AP base stations to utilize available information resources to obtain accurate estimates of time and frequency references, and position, and to implement fall back modes of operation when it is not possible to acquire signals used for navigation.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with devices and apparatuses for self-timing and/or self-locating in access point (AP) base station. In one example, the device may include: a receiver for acquiring Satellite Positioning System (SPS) signals from a first data source (e.g., a plurality of satellites); a backhaul interface for a communication backhaul in operative communication with a macro network; and a transceiver module for communicating with at least one of (a) an access terminal (AT), (b) the macro network via the backhaul, (c) a base station (e.g., macro base station or neighboring AP base station) in operative communication with the macro network, and (d) an alternative data source (e.g., cell site, terrestrial navigation station, server, user input interface, etc.).

The device may further include: an internal clock; at least one processor operatively coupled with the SPS receiver, the backhaul interface, the transceiver module, and the clock; and a memory module operatively coupled with the at least one processor and comprising executable code for the at least one processor. The SPS signals may include SPS time data, SPS frequency data, and SPS position data.

The memory module may include comprising executable code for the at least one processor to: determine an SPS time error based on the SPS time data; determine an SPS frequency error based on the SPS frequency data; and/or determine an SPS position error based on the SPS position data.

In response to the SPS time error not exceeding a defined time error threshold, the at least one processor may synchronize the clock based at least in part on the SPS time data. In response to the SPS frequency error not exceeding a defined frequency error threshold, the at least one processor may obtain a frequency reference based at least in part on the SPS frequency data. In response to the SPS position error not exceeding a defined position error threshold, the at least one processor may estimate a location of the device based at least in part on the SPS position data.

The at least one processor may communicate with a second data source via the transceiver module to obtain at least one of second time data, second frequency data and second position data. In related aspects, the at least one processor may determine relative reliability of the first data source and the second data source by comparing at least one of (i) the SPS time data and the second time data, (ii) the SPS frequency data and the second frequency data, and (iii) the SPS position data and the second position data. The at least one processor may give greater weight to information from one of the first data source and the second data source based on the relative reliability. In the alternative, the at least one processor may utilize information from a selected one of the first data source and the second data source based on the relative reliability.

In further related aspects, the at least one processor may: determine a second time error based on the second time data; determine a second frequency error based on the second frequency data; and/or determine a second position error based on the second position data. In response to the second time error not exceeding the time error threshold, the at least one processor may synchronize the clock based at least in part on the second time data. In response to the second frequency error not exceeding the frequency error threshold, the at least one processor may obtain the frequency reference based at least in part on the second frequency data. In response to the second position error not exceeding the position error threshold, the at least one processor may estimate the device location based at least in part on the second position data. The at least one processor may communicate with a third data source via the transceiver module to obtain at least one of third time data, third frequency data and third position data from the third data source.

In one example, the first data source may comprise a plurality of satellites of a Global Positioning Satellite (GPS) system. The SPS time data may comprise a GPS time stamp included in a GPS signal of the GPS system, and the SPS frequency data may include a GPS frequency reference included in the GPS signal.

In another example, the first data source may comprise an Assisted GPS (A-GPS) system, wherein the transceiver module downloads satellite almanac and ephemeris information via the backhaul; and the at least one processor uses the downloaded information to assist the SPS receiver estimate at least one of the device location and GPS time.

In yet another example, the second data source may comprise a cell site of the macro network, wherein the transceiver module receives at least one of a pilot signal and a sync channel signal from the cell site. The at least one processor may determine a cell location of the cell site based on the at least one of the pilot signal and the sync channel signal, and may use the cell location as a starting estimate for the device location. The at least one processor may calculate pseudo-range information from at least one of the pilot signal and the sync channel signal, and may use the pseudo-range information to estimate at least one of the device location and GPS time.

In still another example, the second data source may comprise a terrestrial navigation system, such as a Long Range Aid to Navigation-C (LORAN-C) system or the like. The at least one processor may: calculate pseudo-range information based at least in part on a LORAN-C signal from a LORAN-C station; may use the pseudo-range information to estimate at least one of the device location and GPS time; and may use the LORAN-C signal to discipline a local oscillator and to track GPS time based at least in part on the device location.

In another example, the second data source may comprise a server in operative communication with the device via the backhaul. The server may comprise at least one of Network Time Protocol (NTP) and Precision Time Protocol (PTP). The transceiver module may: send pseudo-range information and local clock information to the server via the backhaul; and receive from the server at least one of (a) an estimated device location and (b) an estimated GPS time, wherein the at least one of the estimated device location and the estimated GPS time are based at least in part on the pseudo-range information and the local clock information. The at least one processor may implement advanced forward link trilateration (AFLT) or the like.

In yet another example, the second data source may comprise a user input interface through which a user may input data regarding at least one of GPS time, the frequency reference, and the device location.

In still another example, at least one of (i) the time error threshold, (ii) the frequency error threshold, and (iii) the position error threshold comprises both a low-water mark value and a high-water mark value. The at least one processor may: determine a given error for a given received data. In response to the given error not exceeding the low-water mark value, the at least one processor may uses the given received data for at least one calculation. In response to the given error exceeding the low-water mark value, the at least one processor may perform a first defined action (e.g., use another received data in conjunction with the given received data for the at least one calculation). In response to the given error exceeding the high-water mark, the at least one processor may perform a second defined action (e.g., notify a server of the macro network regarding unreliability of the given received data).

In accordance with one or more embodiments and corresponding disclosure thereof, various aspects are described in connection with methods for self-timing and/or self-locating by an access point (AP) base station. In one approach, the method may involve receiving SPS signals from a first data source, wherein the SPS signals may include SPS time data, SPS frequency data, and SPS position data. The method may further involve: interfacing with a communication backhaul in operative communication with a macro network; and communicating with at least one of (a) an access terminal (AT), (b) the macro network via the backhaul, (c) a base station in operative communication with the macro network, and (d) an alternative data source.

The method may further involve: determining an SPS time error based on the SPS time data; determining an SPS frequency error based on the SPS frequency data; and/or determining an SPS position error based on the SPS position data. The method may further involve synchronizing the clock based at least in part on the SPS time data, in response to the SPS time error not exceeding a defined time error threshold. The method may further involve obtaining a frequency reference based at least in part on the SPS frequency data, in response to the SPS frequency error not exceeding a defined frequency error threshold. The method may involve estimating a location of the device based at least in part on the SPS position data, in response to the SPS position error not exceeding a defined position error threshold.

The method may further involve obtaining from a second data source at least one of second time data, second frequency data and second position data. In related aspects, the method may involve determining relative reliability of the first data source and the second data source by comparing at least one of (i) the SPS time data and the second time data, (ii) the SPS frequency data and the second frequency data, and (iii) the SPS position data and the second position data. The relative weight given to information from one of the first data source and the second data source may be based on the relative reliability. Alternatively, information from a selected one of the first data source and the second data source may be used based on the relative reliability.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
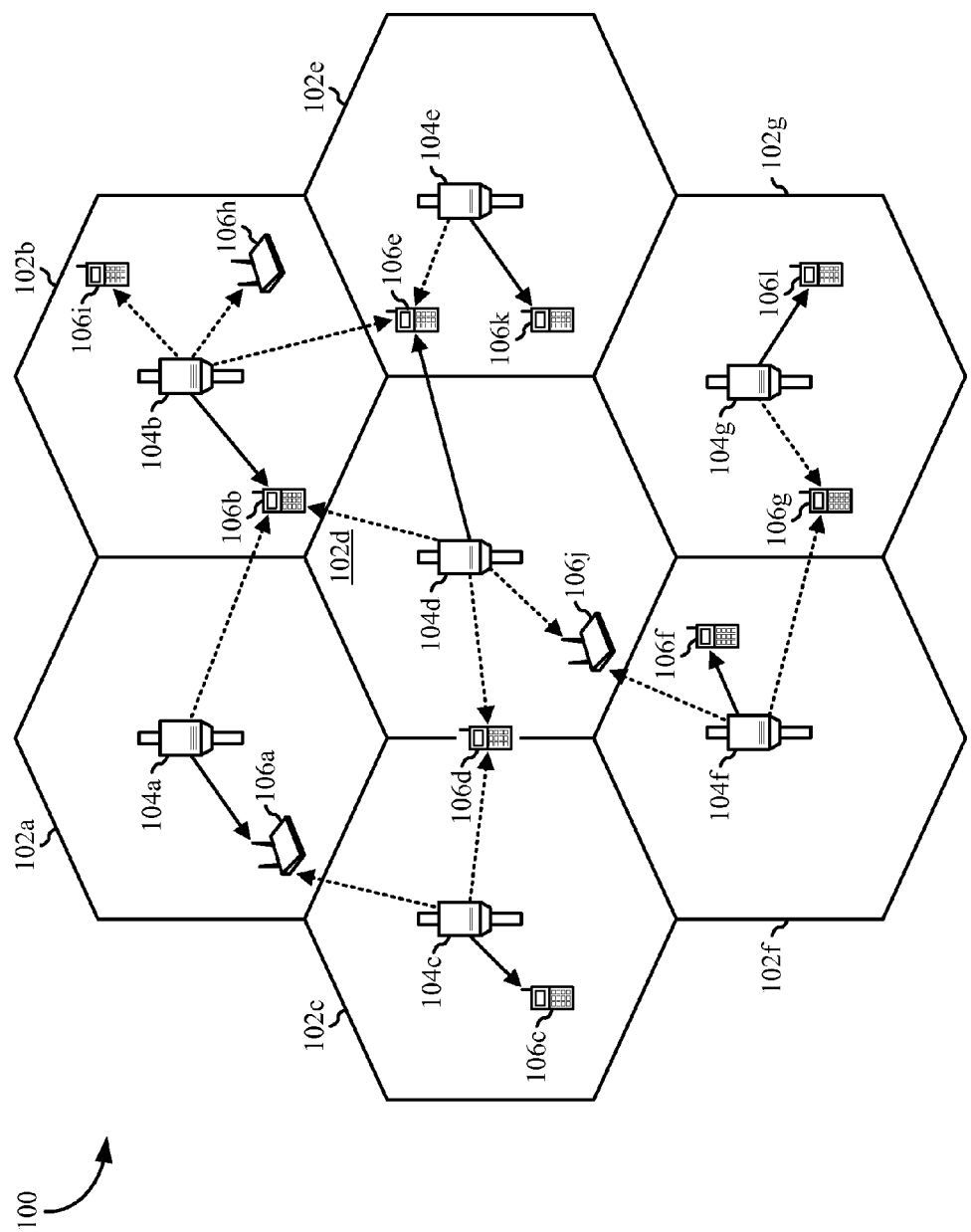
FIG. 1 illustrates an exemplary wireless communication system.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) can be practiced without these specific details. In other instances, well-known structures and devices are shown in block diagram form in order to facilitate describing one or more embodiments.

Access point (AP) base stations can be deployed to individual consumers and placed in homes, apartment buildings, office buildings, and the like. An AP base station can communicate wirelessly with an AT in range of the AP base station utilizing a licensed cellular transmission band. Further, AP base stations may be connected to a core cellular network by way of an Internet Protocol (IP) connection, such as a Digital Subscriber Line (DSL, e.g., including Asymmetric DSL (ADSL), High data rate DSL (HDSL), Very high speed DSL (VDSL), etc.), a TV cable carrying IP traffic, a Broadband over Power Line (BPL) connection, or like connection. The connection between the IP line and the cellular network can be a direct connection, or by way of the internet. An AP base station, therefore, can provide cellular support to an AT or cellular handset and route cellular traffic (e.g., voice, data, video, audio, internet, etc.) to a macro cellular network through the IP connection. This mechanism can save consumers air time costs and reduce a network provider's cellular network traffic load. Also, cellular coverage inside a home, office building, apartment, etc. can be greatly improved via implementation of AP base stations. It is noted that the AP base station can communicate with the core cellular network by way of a non-IP connection that implements Asynchronous Transfer Mode (ATM) or the like.

Although an AP base station is capable of forming a cellular link (e.g., a wireless link utilizing one or more licensed radio network frequencies) with multiple ATs, a consumer typically desires only his or her own traffic to be carried by a private IP connection connected to the AP base station. For instance, consumers may wish to preserve IP bandwidth for their own use, rather than for the use of other AT users. As a result, in certain deployments, an AP base station may be associated with a single AT or group of ATs, and traffic related to such AT(s) is routed over the consumer's IP connection, whereas traffic related to other ATs may have a lower priority or be blocked. Consequently, although the AP base station can communicate with multiple ATs regardless of subscriber, the AP base station is typically programmed to ignore devices that are not associated with a particular consumer, service plan, or the like.

FIG. 1 illustrates an exemplary wireless communication system 100 configured to support a number of users, in which various disclosed embodiments and aspects may be implemented. As shown in FIG. 1, by way of example, system 100 provides communication for multiple cells 102, such as, for example, macro cells 102a-102g, with each cell being serviced by a corresponding macro base station 104 (such as base stations 104a-104g). Each cell may be further divided into one or more sectors. Various access terminals (ATs) 106, including ATs 106a-106k, also known interchangeably as user equipment (UE), are dispersed throughout the system. Each AT 106 may communicate with one or more base stations 104 on a forward link (FL) and/or a reverse link (RL) at a given moment, depending upon whether the AT is active and whether it is in soft handoff, for example. Wireless communication system 100 may provide service over a large geographic region, for example, macro cells 102a-102g may cover a few blocks in a neighborhood.

Figure 2:
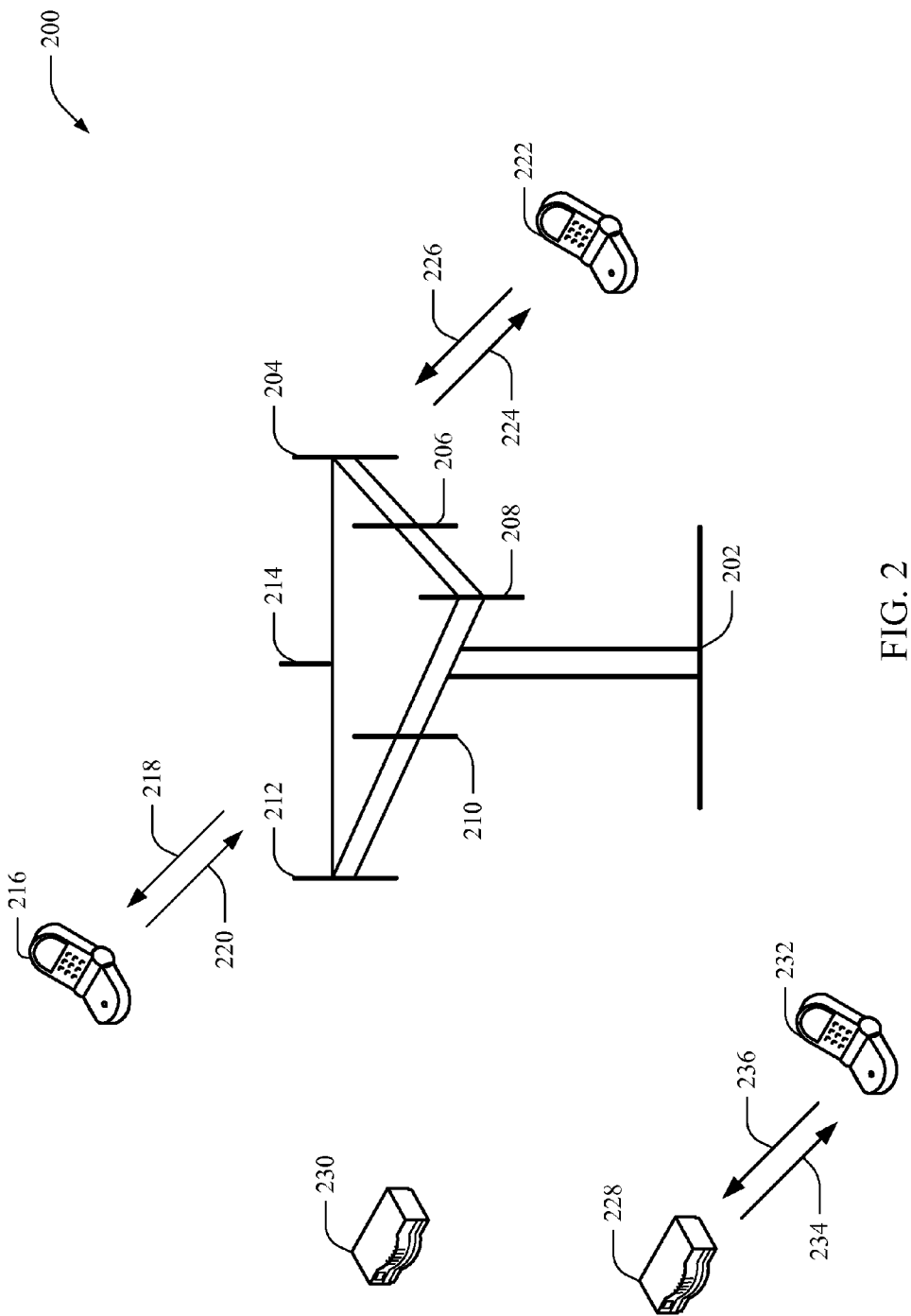
FIG. 2 is an illustration of a wireless communication system in accordance with one or more aspects set forth herein.

Referring now to FIG. 2, a wireless communication system 200 is illustrated in accordance with various embodiments presented herein. System 200 comprises a macro base station 202 that can include multiple antenna groups. For example, one antenna group can include antennas 204 and 206, another group can comprise antennas 208 and 210, and an additional group can include antennas 212 and 214. Two antennas are illustrated for each antenna group; however, more or fewer antennas can be utilized for each group. Base station 202 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art. Base station 202 can communicate with one or more ATs, such as, for example, AT 216 and AT 222.

As depicted in FIG. 2, AT 216 is in communication with antennas 212 and 214, where antennas 212 and 214 transmit information to AT 216 over a forward link 218 and receive information from AT 216 over a reverse link 220. Moreover, AT 222 is in communication with antennas 204 and 206, where antennas 204 and 206 transmit information to AT 222 over a forward link 224 and receive information from AT 222 over a reverse link 226. In a Frequency Division Duplex (FDD) system, forward link 218 can utilize a different frequency band than that used by reverse link 220, and forward link 224 can employ a different frequency band than that employed by reverse link 226, for example. Further, in a Time Division Duplex (TDD) system, forward link 218 and reverse link 220 can utilize a common frequency band and forward link 224 and reverse link 226 can utilize a common frequency band.

Each group of antennas and/or the area in which they are designated to communicate can be referred to as a sector of macro base station 202. For example, antenna groups can be designed to communicate to ATs in a sector of the areas covered by base station 202. In communication over forward links 218 and 224, the transmitting antennas of base station 202 can utilize beamforming to improve the signal-to-noise ratio of forward links 218 and 224 for ATs 216 and 222. Also, while base station 202 utilizes beamforming to transmit to ATs 216 and 222 scattered randomly through an associated coverage, ATs in neighboring cells can be subject to less interference as compared to a base station transmitting through a single antenna to all its ATs. Moreover, ATs 216 and 222 can communicate directly with one another using a peer-to-peer or ad hoc technology in one example.

Similar functionality of macro base station 202 can be implemented in AP base stations 228 and 230, which can be deployed in smaller scale locations, such as a residence or office building for example. As mentioned previously, AP base stations are also referred to as femto cells or Home Node B (HNB) units, and can have a broadband backhaul link to a wireless service provider, such as over DSL, cable, T1/T3, etc., and can provide wireless communication service to one or more ATs. As shown, AP base station 228 can communicate with one or more AT(s) 232 over a forward link 234 and receive communication from the AT(s) 232 over a reverse link 236 similarly to the base station 202.

According to an example, AP base station 230 can be deployed to provide wireless service access. Upon being deployed, AP base station 230 can optionally self-configure to avoid interference with surrounding femto cells (e.g., AP base station 228) and macro cells (e.g., base station 202 or a sector/cell thereof). In this regard, AP base station 230 can receive signals from the base station 202 and disparate AP base station 228 much like ATs 216, 222, and 232. The signals can be overhead system messages that can be utilized by the AP base station 230 to determine configuration parameters utilized by the disparate AP base station 228 and/or base station 202.

The configuration parameters can be determined by AP base station 230 for similar environment configuration. In addition, the parameters can be determined and utilized to ensure AP base station 230 selects different parameters to mitigate interference. These parameters can include, for example, a channel identifier (e.g., a Code Division Multiple Access (CDMA) channel ID), a pseudo-noise (PN) offset, and/or the like, for AP base station 228, macro base station 202, and/or substantially any other surrounding transmitters. AP base station 230 can accordingly self-configure its channel identifier, PN offset, etc. so as not to interfere with the surrounding femto cells and macro cells. Additionally, AP base station 230 can utilize this information to build a neighbor list of surrounding femto cells and macro cells to facilitate hard and soft handoffs for devices communicating with AP base station 230. It is noted that AP base station 230 may be adapted to receive radio frequency (RF) signals, for example, from AP base station 228 and/or base station 202 to determine timing, location, and/or the like.

Figure 3:
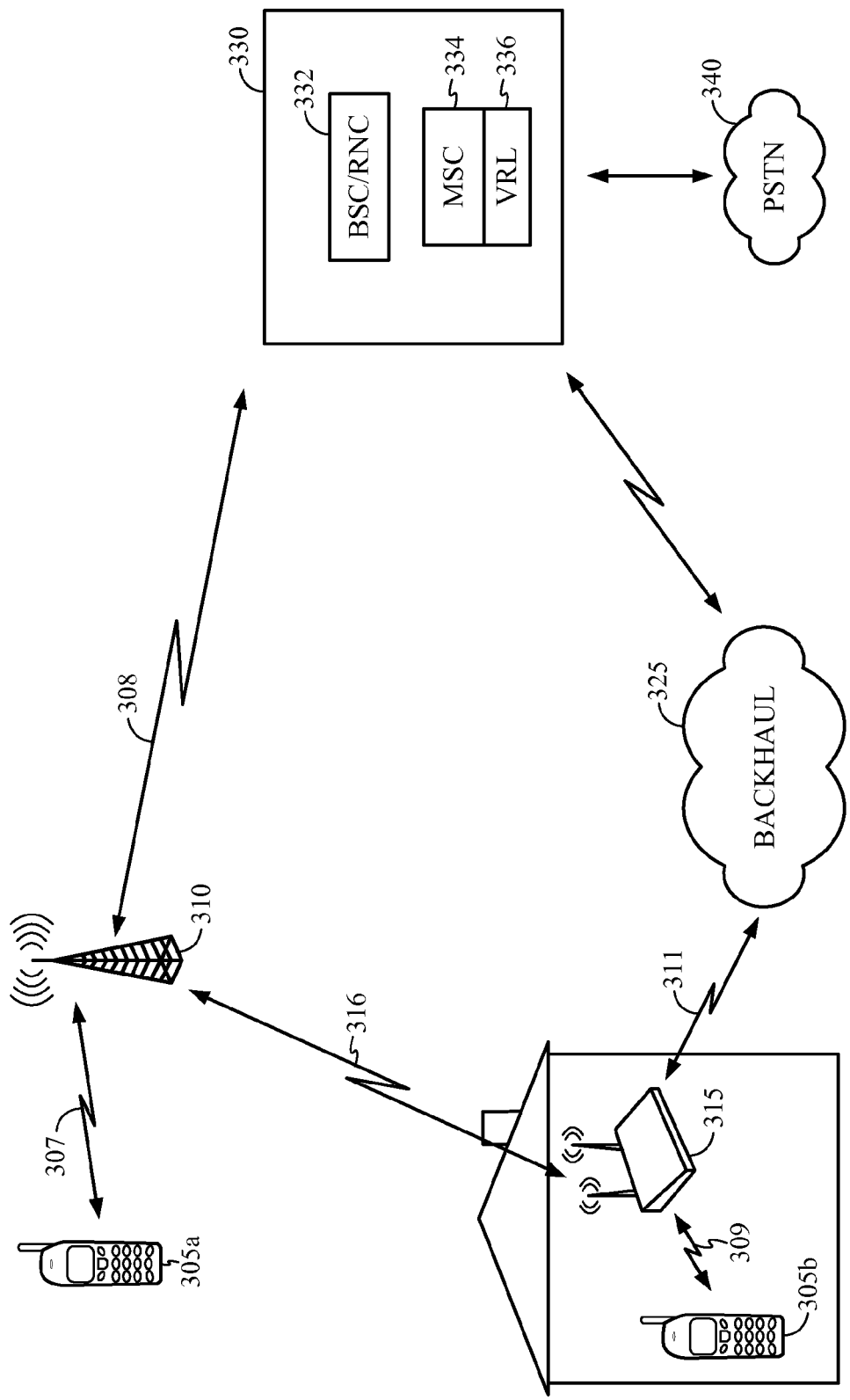
FIG. 3 illustrates an exemplary environment within which an AP base station may be implemented.

In accordance with one or more aspects of the embodiments described herein, FIG. 3 illustrates an exemplary system 300 within which an AP base station 315 may be implemented. System 300 may include an AT 305a in operative communication with a macro base station 310 operatively coupled to a macro network 330, which comprises or is otherwise operatively coupled to a macro network core. System 300 may also include an AT 305b in operative communication with AP base station 315, operatively coupled to a communication backhaul 325, which is in turn operatively coupled to the network core of macro network 330.

In operation, mobile device 305a may send and receive data from macro base station 310 via a communication link 307, which may use various communication standards such as CDMAone, CDMA2000, Wideband CDMA (W-CDMA, also known as Universal Mobile Telecommunications System (UMTS)), Ultra Mobile Broadband (UMB), Long Term Evolution (LTE), LTE-Advanced (LTE-A), Worldwide Interoperability for Microwave Access (WiMAx), etc. Base station 310 may be in communication with macro network 330 via link 308. It is noted that system 300 may be configured to operate on 3rd Generation Partnership Project (3GPP) (Re199, Re15, Re16, Re17) technology, as well as 3GPP2 (1xRTT, 1xEV-DO Re10, RevA, RevB) technology, and other known and related technologies.

Macro network 330 may include a network controller at its network core. Depending on the types of the communication network deployed, the network controller may be a Radio Network Controller (RNC), a modified RNC, an Unlicensed Mobile Access (UMA) network controller, or a Session Initiation Protocol (SIP) gateway, or the like. In the illustrated example, macro base station 310 is in operative communication with RNC 332 of macro network 330. In the embodiment of FIG. 3, macro network 330 includes a Base Station Controller (BSC) or RNC 332. BSC/RNC 332 may be in operative communication with a Message Switching Center (MSC) 334 or similar service delivery node responsible for handling voice calls, Short Message Service (SMS), as well as other services (e.g., conference calls, FAX and circuit switched data). MSC 334 may set up and release the end-to-end connections, handle mobility and hand-over requirements during the call, take care of charging and real time pre-paid account monitoring, etc.

MSC 334 may include or be coupled to a Visitor Location Register (VLR) 336 or similar temporary database of network subscribers who have entered or roamed into a particular area. VLR 336 may be in operative communication with a registry (not shown), which may generally comprise a database that contains details of mobile phone subscribers authorized to use the operator's network. MSC 334 may be in operative communication with a Public Switched Telephone Network (PSTN) 340, Public Line Mobile Network (PLMN), or other similar network. In this way, macro network 330 can deliver voice and data services to end users that are connected to one of those networks. System 300 may be scaled to include additional MSCs and registries (not shown) in operative communication with MSC 334 to increase capacity.

In related aspects, mobile device 305b may communicate with macro network 330 via macro base station 310 and/or AP base station 315 configured to use backhaul service 325 to transfer voice and/or non-voice data there between. Backhaul service 325 may include the internet, a DSL service, a cable internet service, a Local Area Network (LAN), a Wide Area Network (WAN), a Plain Old Telephone System (POTS), or any other suitable broadband network or the like. Mobile 305b may communicate with base station 315 via communication link 309, and may incorporate one or more features of AP base stations described above with reference to FIG. 2. It is noted that base station 315 includes as one of its features the ability to provide a femto cell through which a given AT may communicate with the network core of the macro network 330.

AP base station 315 may be configured to transfer data over backhaul network 325 via communication link 311 (wired or wireless). Depending on the type of system being deployed, communication link 311 may use Voice over IP (VoIP), UMA signaling, SIP signaling, or other suitable communication network protocol, such as, for example, Iub over IP. Iub is a standard transport protocol that may be designed to encapsulate voice and/or non-voice data and to signal as an IP that is tunneled over network 325.

Macro network 330 may process data received from network 325 with a suitable network controller, analogous to the manner in which macro network 330 handles data from macro base station 310. The type of network controller used by macro network 330 depends at least in part on the architecture or types of components of AP base station 315. For example, there are various femto cell architectures such as, for example, IP Radio Access Network (RAN) and SIP/IMS. Within the IP RAN architecture there may be provided various femto cell solutions, such as, for example, modified RNCs, concentrators, etc. implementing various hardware architectures in the network core and/or in the AP base station.

It is also noted that system 300 may comprise WAN macro cells and femto cells deployed within the same general geographical area that reuse the same carrier as the WAN system. In one approach, the WAN system may use a legacy technology, while the femto cell system may use a new technology, such as, for example, an evolved version of the legacy technology that supports AP base station operation efficiently.

In accordance with one or more embodiments and corresponding disclosure thereof, various aspects are described in connection with an AP base station configured to utilize all or a plurality of the available information resources to obtain estimates of time and frequency references, and position/location. The AP base station is preferably configured to implement fall back modes of operation when it is not possible to acquire signals from a given information source (e.g., positioning satellites) or when the received data regarding time, frequency, and/or position are not reliable (e.g., the error of the received data exceeds a defined error threshold).

Figure 4:
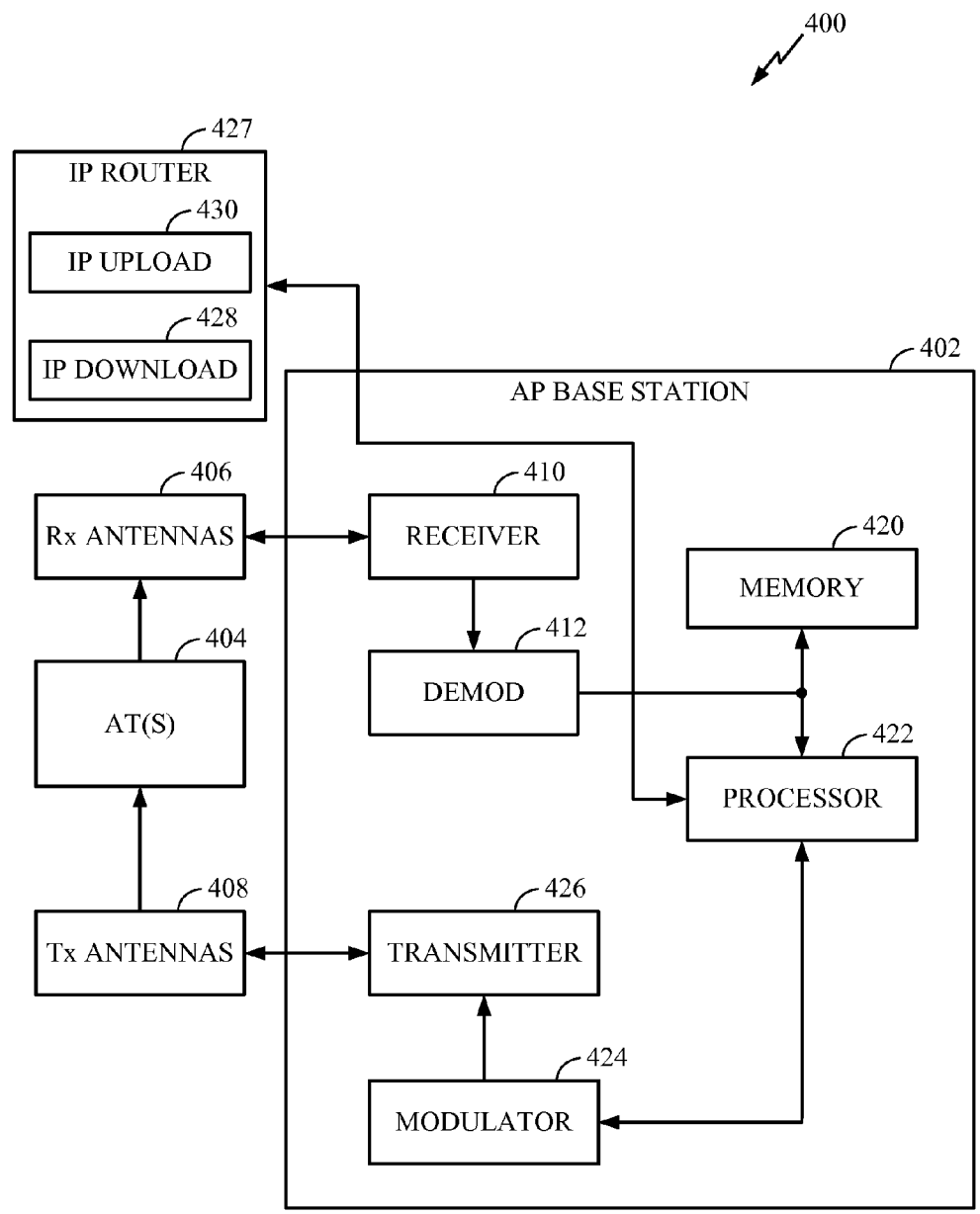
FIG. 4 provides a block diagram of an exemplary AP base station.

With reference to FIG. 4, there is provided an exemplary system 400 comprising an AP base station 402 that may include a receiver component/module 410 adapted to receive signal(s) from AT(s) 404 or from other AP base stations (not depicted) through a plurality of receive antennas 406. AP base station 402 may also include a transmitter component/module 426 adapted to transmit to the AT(s) 404 (or other AP base stations) through one or more transmit antennas 408. Receiver component 410 may receive information from receive antennas 406 and may further comprise a signal recipient (not shown) that receives uplink data transmitted by AT(s) 404. It should be appreciated that receiver component 410 and transmission component 426 may be configured to communicate with ATs or other AP base stations via wireless local area network (WLAN), BPL, Ethernet, UMTS-TDD, or WLAN over UMTS-TDD (e.g., to implement WLAN over a cellular frequency to communicatively couple AP base stations). It is noted a transceiver module (not depicted) may be used in lieu of, or in conjunction with, receiver component 410 and transmission component 426.

Receiver component 410 may be operatively associated with a demodulator 412 adapted to demodulate received information. Demodulated symbols may be analyzed by a processor 422 to generate additional signals (e.g., in the form of transmission and/or routing instructions) modulated by modulator 424 and transmitted by transmitter component 426. Further, processor 422 may be coupled to a memory 420. Memory 420 may store information pertinent to effectuating wired and/or wireless communication, application modules for routing information between neighboring AP base stations, macro base stations, and/or ATs, and/or any other suitable information related to performing the various actions and functions set forth herein.

Processor 422 may route at least a portion of traffic associated with a communication link between AP base station 402 and AT 404 to a neighboring AP base station (not depicted) for transfer to a cellular network (e.g., by way of a direct connection to the cellular network, or by way of the Internet). Furthermore, processor 422 may be adapted to direct traffic affiliated with AP base station 402 (e.g., generated by a predetermined AT or group of ATs, for instance) directly to the cellular network by way of an IP upload link 430 (e.g., DSL connection, such as ADSL, VDSL, HDSL, or cable IP connection, or BPL connection). In addition, data may be received from the cellular network via an IP download link 428 (e.g., DSL, cable, BPL) and directed to an AT 404 affiliated with the AP base station 402. It is noted that AP base station 402 may comprise one or more processors 422.

Receiver component 410 and transmission component 426 may receive and transmit, respectively, various information to/from a cellular network (e.g., via IP upload 430 and/or IP download 428) or to/from other AP base stations by way of an IP router 427 that communicates over unlicensed frequencies or wired connections (e.g., WLAN router, LAN router, or the like). It is noted that the receiver and transmitter components/modules 410, 426 may be part of or replaced with a transceiver module (not depicted) in other embodiments. The depicted receiver 410 and transmitter 426, or alternatively a transceiver, may be adapted to support communication links with a plurality of APs. The APs may comprise a WAN interferer jamming a first bandwidth portion of the spectrum, wherein the interferer is assigned to the first bandwidth portion by a WAN AP during a first occurrence of an interlace.

AP base station 402 may include a satellite positioning system (SPS) receiver (not depicted) for acquiring SPS signals from a first data source (e.g., a plurality of satellites), wherein the SPS signals comprise SPS time data, SPS frequency data and SPS position data. AP base station 402 may include a transceiver module (not depicted) for communicating with at least one of (a) an AT, (b) the macro network via the backhaul, (c) a base station (e.g., macro base station or neighboring AP base station) in operative communication with the macro network, and (d) an alternative data source.

In related aspects, memory 420 may contain application modules or applications that generate or comprise code/instructions for processor 422 to: determine an SPS time error based on the SPS time data; determine an SPS frequency error based on the SPS frequency data; and/or determine an SPS position error based on the SPS position data. Memory 420 may contain instructions for processor 422 to: (a) in response to the SPS time error not exceeding a defined time error threshold, synchronize the clock based at least in part on the SPS time data; (b) in response to the SPS frequency error not exceeding a defined frequency error threshold, obtain a frequency reference based at least in part on the SPS frequency data; and/or (c) in response to the SPS position error not exceeding a defined position error threshold, estimate a location of the device based at least in part on the SPS position data.

In further related aspects, processor 422 may communicate with a second data source (e.g., cell site, terrestrial navigation station, server, user input interface, etc.) via the transceiver module to obtain at least one of second time data, second frequency data and second position data. For example, processor 422 may determine relative reliability of the first data source and the second data source by comparing at least one of (i) the SPS time data and the second time data, (ii) the SPS frequency data and the second frequency data, and (iii) the SPS position data and the second position data. Processor 422 may give greater weight to information from one of the first data source and the second data source based on the relative reliability. In the alternative, processor 422 may utilize information from a selected one of the first data source and the second data source based on the relative reliability. The manner in which a given AP base station acquires, compares, and utilizes time data, frequency data, and/or position data is explained in further detail below.

Figure 5:
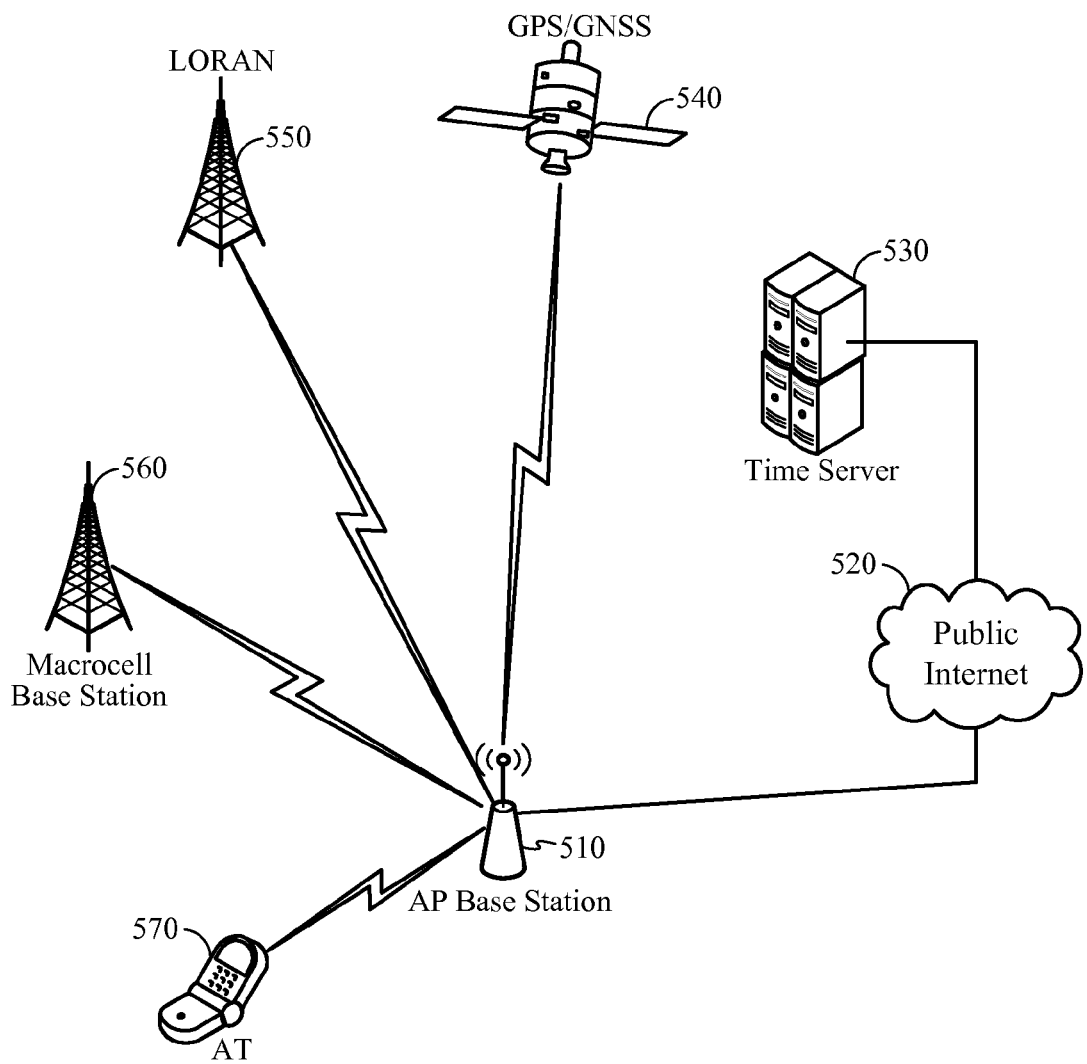
FIG. 5 illustrates one embodiment of an AP base station in operative communication with time and/or positioning information sources.

With reference to FIG. 5, there is shown one embodiment of an AP base station 510 with a backhaul link to public Internet 520. AP base station 510 may service one or more ATs 570 within its femto cell coverage area. AP base station 510 may be in operative communication with and configured to access a time server 530 via the backhaul. AP base station 510 may be in operative communication with numerous other information sources, including but not limited to: positioning satellite 540; Long Range Aid to Navigation (LORAN) station 550; and macro base station 560. AP base station 510 may utilize these and/or other information sources to acquire or estimate Global Positioning Satellite (GPS) time or Universal Time Coordinated (UTC), to discipline a local oscillator, and/or to determine position. This is particularly beneficial in situations where AP base station 510 is located in a place where signals (e.g., GPS signals) from a given information sources is blocked or otherwise unavailable.

The techniques described herein may exploit certain characteristics/features that are unique to AP base stations to overcome the difficulties of time, frequency, and position acquisition under weak signal conditions. For example, AP base station 510 is typically in a fixed location, such that its positioning function only has to acquire the position once (assuming AP base station 510 is not being moved around), which may otherwise take up a substantial amount of time or other resources. Further, when AP base station 510 is not moving, it is possible to integrate the GPS waveform over substantially longer intervals than would otherwise be possible for a GPS receiver in motion.

Another characteristic of AP base station 510 is its connection to the Internet through a backhaul network, which may provide several advantages. A first advantage is that the connection may be used to provide an approximate position, since Internet service providers typically have some information about the location of their customers. Second, the Internet Protocol address (IP address) associated with AP base station 510 may be used to determine a user's geographic latitude, longitude and, by inference, city, region and nation. Third, AP base station 510 may acquire an estimate of GPS time or UTC using a Network Time Protocol (NTP) client or a Precision Time Protocol (PTP) client in communication with one or more network time servers. Fourth, AP base station 510 can download satellite ephemeris and almanac information via the backhaul, relieving it of the necessity of demodulating a positioning data channel (e.g., GPS data channel), or establishing data connection over the cellular network to obtain this data. The above described advantages, especially when taken together, may substantially reduce the searching necessary for acquiring satellite or pseudolite signals, thereby eliminating the need to demodulate associated data channels.

For example, the above described characteristics of AP base stations may provide useful information to a positioning receiver (e.g., GPS receiver) attempting to acquire position and timing information, and may provide a way to obtain information that may be used to assist the positioning receiver and/or other techniques implemented by a given AP base station in acquiring time, frequency, and location estimates.

In accordance with one aspect of the embodiments described herein, the technique for position location may involve the use in the AP base station of a receiver for a GPS system or other Satellite Positioning System (SPS), such as, for example, the Global Navigation Satellite System (GLONASS/GNSS), the proposed European Galileo System, etc. It is noted that GPS is a satellite-based navigational system formed by a network of satellites broadcasting pseudo-random noise (PRN) codes modulated on a carrier band. GPS satellites transmit signals from which GPS receivers may estimate their locations. Each GPS satellite may transmit signals using two carrier signals. The first carrier signal may be modulated using two PRN codes, namely a coarse acquisition (C/A) code, and a precise (P) code. Each GPS satellite may use different PRN codes to distinguish it from the other satellites of the GPS.

Determining the location of a GPS receiver may involve the acquisition and tracking of at least four satellite signals. GPS signal acquisition often involves computing the correlation between the received GPS signals and the C/A code of associated satellites at various phase offsets and Doppler-shifted frequencies. Following signal acquisition, a signal tracking process may decode the signals from the identified satellites at the phase offsets and Doppler-shifted frequencies. During the signal tracking phase, navigation data may be received from the identified satellites. Embedded in the navigation data transmitted by the GPS satellites are data related to satellite positioning as well as clock timing (i.e., time stamp), commonly referred to as ephemeris data, from which the position of the GPS receiver may be detected.

To detect the position of a GPS receiver when fewer than four satellites are in clear view, CDMA signals or the like transmitted by macro/ground base stations may be used to estimate the location of the GPS receiver of the AP base station. Communication between a wireless device and a macro base station is often established by a forward link via which signals are transmitted from the macro base station to the wireless device, and a reverse link via which the signals transmitted from the wireless device are received by the base station.

In related aspects, the SPS (e.g., GPS or the like) may include a combination of satellites and pseudolites. Pseudolites are ground-based transmitters, which broadcast a PN code (similar to a GPS signal) modulated on an L-band carrier signal, generally synchronized with SPS time. Each transmitter may be assigned a unique PN code so as to permit identification by a remote receiver. Pseudolites are useful in situations where SPS signals from an orbiting satellite might be unavailable, such as tunnels, mines, buildings or other enclosed areas. The term "satellite", as used herein, is intended to include pseudolite or equivalents of pseudolites, and the term GPS signals, as used herein, is intended to include GPS-like signals from pseudolites or equivalents of pseudolites. Such a method using a receiver for SPS signals may be completely autonomous, or may utilize a cellular network to provide assistance data or to share in the position calculation, as described in further detail below. As shorthand, these various techniques may be called "SPS".

In one embodiment, the AP base station may use GPS navigation signals to estimate time (e.g., GPS time, UTC, or the like) to within tens of nanoseconds, to discipline an oscillator to run at a specified frequency with high accuracy, and/or to estimate position to within meters or tens of meters. It is noted that the atomic clocks on satellites are typically set to GPS time. GPS time is not corrected to match the rotation of the Earth, so it does not contain leap seconds or other corrections which are periodically added to UTC. The GPS navigation message may include the offset/difference between GPS time and UTC. Accordingly, GPS/SPS receivers of the AP base station preferably subtract this offset from GPS time to calculate UTC and specific time zone values.

In accordance with another aspect of the embodiments described herein, Assisted GPS (A-GPS) may be used to improve the reliability or accuracy of GPS. A-GPS generally involves providing extra information to the GPS receiver to facilitate the acquisition and tracking of GPS signals. Such assistance is intended to significantly reduce the Doppler and code space that the GPS receiver must search in order to acquire and track the GPS signal, and to eliminate the need for the GPS receiver to demodulate the GPS data channel. Both of these things contribute to significant increase in the receiver sensitivity, allowing the GPS receiver to provide a fix and a time estimate in locations where it would not be able to operate without assistance. For example, the additional information provided to the GPS receiver may include: initial estimates of time and/or position from a source other than GPS; and/or satellite almanac and ephemeris information from a source other than the demodulated GPS data channel.

In accordance with another aspect of the embodiments described herein, terrestrial navigation signals, such as, for example, LORAN signals (e.g., LORAN-C signals) may be used for determination position/location and for acquiring and tracking an estimate of time (e.g., GPS time, UTC, or the like). For example, the AP base station may include a LORAN-C module that includes an antenna and position sensor/processor. The LORAN-C signal may be received at the AP base station where they are processed, and the resulting position determination may then be transmitted to a fixed station (e.g., LORAN-C station or the like).

The LORAN-C system can operate as an independent backup to the SPS in numerous modalities (aviation, marine, terrestrial, and timing applications). In the alternative, or in addition, the LORAN-C system can work in conjunction with the SPS. For example, the SPS can be used to generate ground conductivity correction factors that greatly enhance LORAN-C's accuracy, and/or LORAN-C can be used to transmit differential SPS corrections and integrity messages to improve SPS performance.

In accordance with another aspect of the embodiments described herein, Advanced Forward Link Trilateration (AFLT), Time Difference of Arrival (TDOA), Round Trip Delay (RTD), and/or Altitude Aiding may be used to determine or estimate the location/position of the AP base station. For example, in the AFLT approach, in contrast to A-GPS, the trilaterization technique does not use GPS satellites to determine location; rather, to determine location, the device (e.g., an AT or an AP base station) takes measurements of signals from nearby macro base stations (towers) and reports the time/distance readings back to the network, which are then used to triangulate an approximate location of the device. At least three surrounding base stations are typically used to get an optimal position fix.

Figure 6:
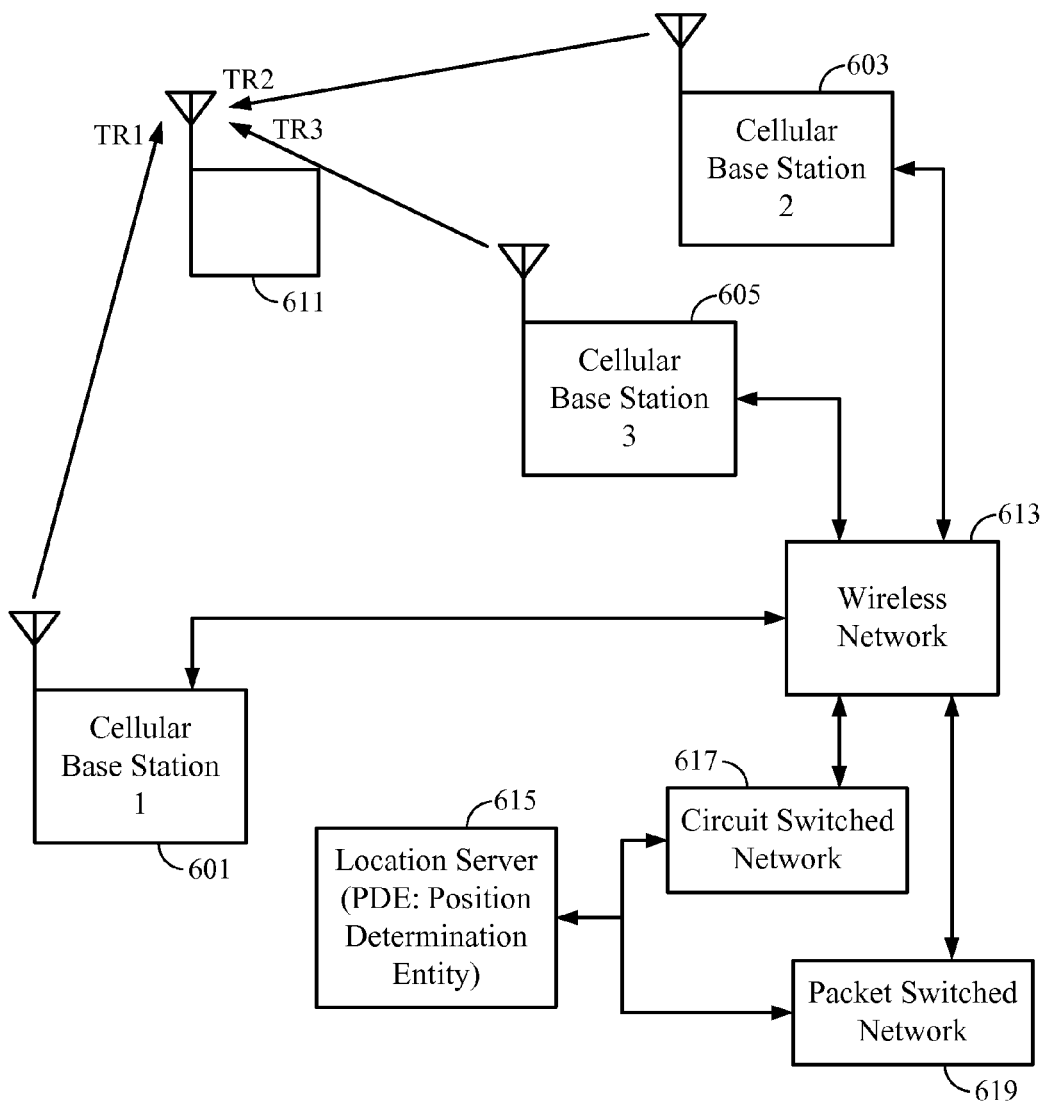
FIG. 6 shows an exemplary cellular network for determining the position of an AP base station.

FIG. 6 shows an exemplary embodiment of an AFLT system where the times of reception (TR1, TR2, and TR3) of signals from macro base stations 601, 603, and 605 are measured at AP base station 611. This timing data may then be used to compute the position of AP base station 611. Such computation may be done at AP base station 611 itself, or at a location server (e.g., location server 615) if the timing information so obtained by the AP base station 611 is transmitted to the location server via a backhaul or other communication link.

Typically, the times of receptions are communicated to location server 615 through one of the macro base stations (e.g., cellular base station 601, or 603, or 605). The location server 615 may be coupled to receive data from the macro base stations through wireless network 613 (e.g., a mobile switching center), circuit switched network 617 (e.g., land line Public Switched Telephone Network), and/or packet switched network 619 (e.g., packet data service node). The location server may include a base station almanac (BSA) server, which provides the location of the macro base stations and/or the coverage area of macro base stations. It is noted that the BSA server may also include information regarding the location and coverage area of AP base stations in operative communication with the network via backhaul links. It is also noted that the location server and the BSA server may be separate from each other, and the location server may communicate with the base station to obtain the base station almanac for position determination.

A mobile switching center may provide signals (e.g., voice communications) to and from a land line PSTN or a packet data service node so that signals may be conveyed to and from the mobile telephone to other telephones (e.g., land line phones on the PSTN or other mobile telephones). The location server may also monitor emissions from several of the base stations in an effort to determine the relative timing of these emissions.

In another approach, a TDOA technique may be implemented to determine the location of AP base station 611, whereby the times of reception of a signal from AP base station 611 are measured at several macro base stations (e.g., measurements taken at base stations 601, 603 and 605). FIG. 6 applies to this case if the arrows of TR1, TR2, and TR3 are reversed. This timing data may then be communicated to the location server to compute the position of the AP base station.

In yet another approach, an RTD technique may be used to determine the location of an AP base station. For example, the RTD may be determined for signals that are sent from the macro base station to the AP base station and then returned. In a similar, but alternative, method the round trip delay is found for signals that are sent from the AP base station to the macro base station and then returned. Each of these round-trip delays may be divided by two to determine an estimate of the one-way time delay. Knowledge of the location of the macro base station, plus a one-way delay constrains the location of the AP base station to a circle on the earth. Two such measurements from distinct macro base stations then result in the intersection of two circles, which in turn constrains the location to two points on the earth. A third measurement (even an angle of arrival or cell sector) resolves the ambiguity.

In still another approach, a combination of either the AFLT or TDOA with an SPS technique, sometimes referred to as a hybrid system, may be used to determine the position of the AP base station. It is noted that altitude aiding or the like may be used to determine the position of an AP base station. Altitude aiding is typically based on a pseudo-measurement of the altitude. The knowledge of the altitude of a location of the AP base station constrains the possible positions of the AP base station to a surface of a sphere (or an ellipsoid) with its center located at the center of the earth. This knowledge may be used to reduce the number of independent measurements required to determine the position of the AP base station.

Figure 7:
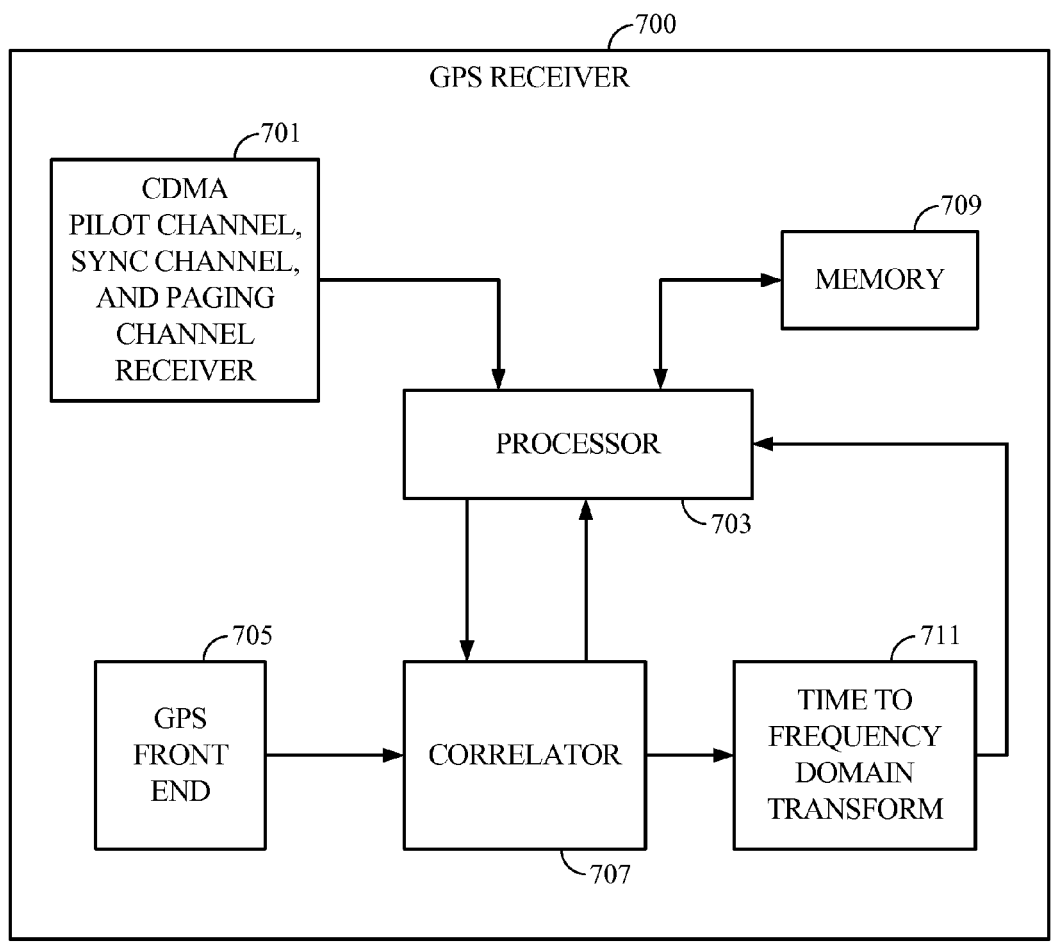
FIG. 7 shows one embodiment of a Global Positioning Satellite (GPS) receiver that may be implemented in an AP base station.

In accordance with another aspect of the embodiments described herein, pilot and sync channel signals from CDMA cell sites may be used by AP base stations to estimate position and time, and/or to derive a frequency reference. With reference to the exemplary embodiment shown in FIG. 7, there is provided a GPS receiver 700 of an AP base station. However, it will be understood that use of pilot and/or sync channel signals for self-timing and/or self-locating are applicable to any positioning receiver of an AP base station.

The GPS receiver 700 may include a CDMA pilot/reference channel, sync channel, and paging channel receiver 701 that may be used to detect CDMA signals which indicate the identity of a macro base station from which such signals originate. The receiver 700 also may include a processor 703, a GPS front end 705, a correlator 707, memory 709, and a time to frequency domain transform processor 711.

By knowing the identity of the macro base station from which such signals received by the GPS receiver 700 were transmitted, the location of a macro base station can be determined by a look-up table within the receiver 700. The location of the receiver 700 may then be known to within a distance equal to the distance from which the receiver 700 can receive signals transmitted by the macro base station.

It should be noted that CDMA system time may be determined from the signals received from the macro base station. It is noted that GPS time may not be determined accurately because of the offset in time that is imposed by the propagation of the signal from the macro base station to the GPS receiver 700. This offset may be accounted for in an embodiment in which the GPS receiver includes or is otherwise in operatively coupled with a CDMA compatible AP base station by measuring the round trip delay.

In related aspects, by receiving CDMA system time and the location of the nearest CDMA macro base station that can be received, the GPS receiver 700 can check a stored almanac. The information in the almanac can then be used to determine which satellites are likely to be in view (i.e., from which satellites the GPS receiver 700 is likely to be able to receive signals). Determining which satellites are in view can greatly reduce the amount of search time required to acquire a GPS satellite.

In accordance with another aspect of the embodiments described herein, microcell beacon assisted determination of position, time, and/or frequency may be implemented by a AP base station. While SPS based position determination or hybrid position determination systems can provide highly reliable and precise location, time, and/or frequency information when the AP base station is in certain geographic environments, the location fix yield can be reduced due to the blockage of navigation signals (e.g., in the deep indoor environments). Even when wireless cellular communication systems are utilized to supplement the GPS system (e.g., AFLT or the like) in a hybrid position system, resulting location fixes may still not be precise enough to enable many valuable location based services.

In one approach, a microcell beacon broadcasts identification information (e.g., the unique ID of the transmitter, a street address, an identity of a commercial site), which can be used to look up for a position coordinate of the transmitter. Further details regarding microcell beacons are provided in U.S. patent application Ser. No. 11/547,290, entitled "Methods and Apparatuses for Beacon Assisted Position Determination Systems," filed Apr. 16, 2008, assigned to the assignee hereof and hereby expressly incorporated by reference herein. The same or similar techniques may be used by an AP base station for self-timing and/or self-locating. The identification information broadcast at the microcell beacon and received at the AP base station may be further transmitted from the AP base station to a remote server (e.g., a position determination entity) using a backhaul link and/or other communication link to determine the position of the AP base station. In the alternative, or in addition, altitude information broadcast by the microcell beacon can be used for altitude aiding in determining the position of AP base station.

In related aspects, one or more microcell beacons may be used with a wide area location system, such as a hybrid GPS system, to provide precise location fixes in highly blocked environments where there are commercial and/or safety based applications. For example, microcell beacons can be used in areas where it is desirable to have a fast and precise location identification for emergency responses (e.g., an area of a high crime rate or accident rate). Thus, the location of the AP base station from which an emergency call (e.g., 911) is placed can be quickly identified in the these areas where the blockage of GPS signals may otherwise prevent a fast and precise location identification based on only the wide area location system.

In further related aspects, microcell beacons use short range data transmitters that are based on mass market electronics for local area data communication, such as, for example, Bluetooth, Wi-Fi, or the like. These beacons may be installed in areas where precise locations of the AP base stations and/or any access terminal (AT) in communication with the AP base station are valuable based on commercial or safety reasons. It is noted that the transceiver modules of AP base stations can be equipped with the capabilities to receive the microcell beacon signals (e.g., using Bluetooth chips or WiFi based electronics).

In accordance with another aspect of the embodiments described herein, there is provided a geolocation technique wherein the an IP address associated with the AP base station and/or the backhaul is used to determine a user's geographic latitude, longitude and, by inference, city, region and nation by comparing the user's public Internet IP address with known locations of other electronically neighboring servers and routers.

In accordance with another aspect of the embodiments described herein, an AP base station may communicate with a remote time source via a backhaul (wired or wireless) to synchronize its one or more internal clocks to GPS time, UTC or other time standard/reference. For example, the remote time source may be one of numerous servers in an IP network that are synchronized to UTC via radio, satellite, modem, or the like. The remote time source may be used to provide time information to update or synchronize an internal clock of the AP base station. For example, this may be achieved with an NTP software program. NTP is an Internet standard protocol for synchronizing clocks to some time reference. For example, NTP may be run in the positioning module/receiver or by at least one processor of the AP base station.

NTP is a reliable time information source for syncing a time reference of the AP base station, and may be designed to resist the effects of variable latency by using a jitter buffer. NTP can usually maintain time to within ten milliseconds over the public Internet, and can achieve accuracies of two hundred microseconds or better in local area networks under ideal conditions. NTP is commonly used to synchronize to UTC.

In the alternative, or in addition, the AP base station may synchronize an internal clock via PTP, which is a time-transfer protocol that allows precise synchronization of networks (e.g., Ethernet). Accuracy within the nanosecond range can be achieved with PTP when using hardware generated timestamps. PTP may be run in the processor or elsewhere in the AP base station to acquire accurate time estimates from associated network time servers.

Figure 8A:
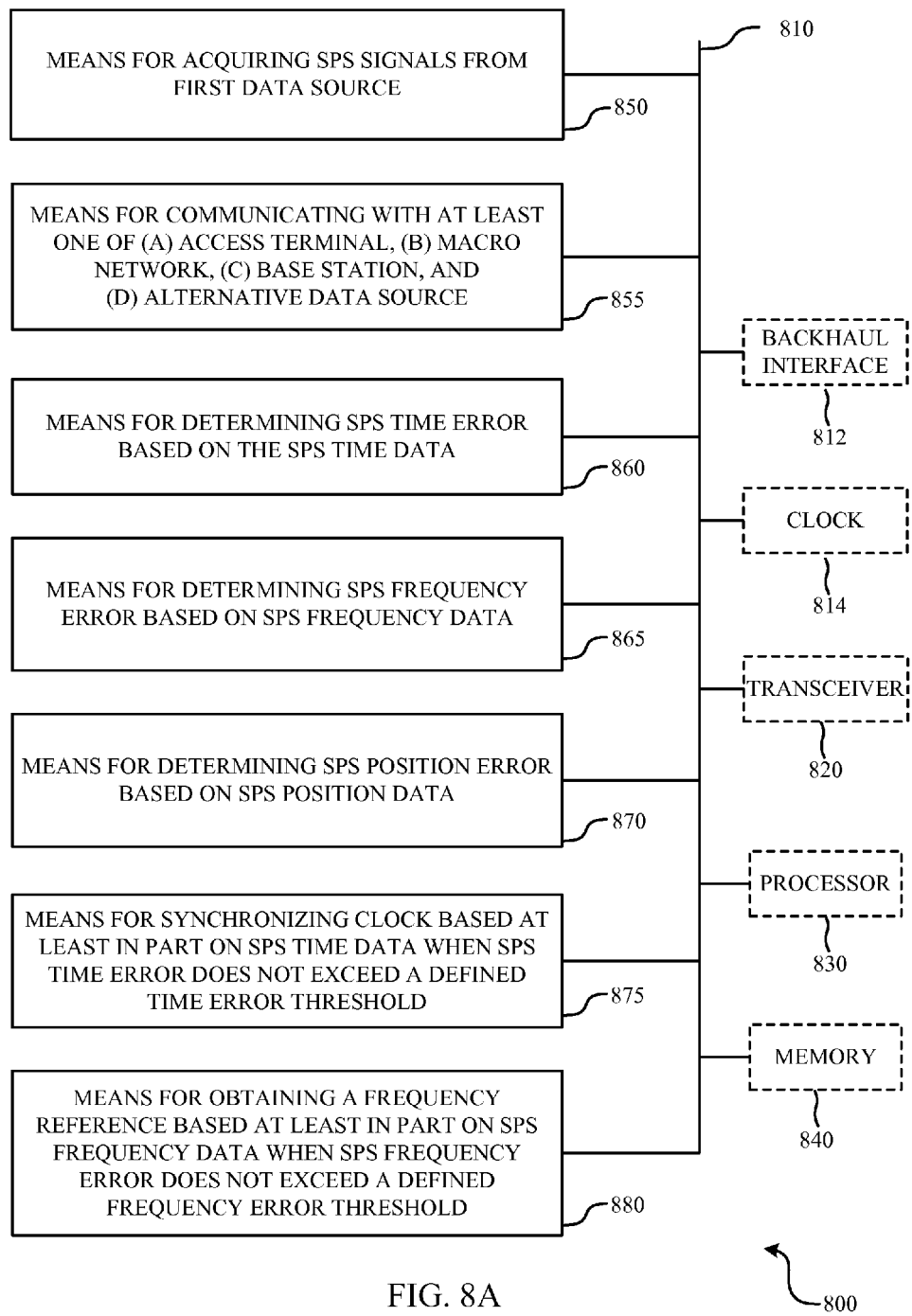
FIGS. 8A-B illustrate one embodiment of an apparatus configured for self-timing and/or self-locating.

In accordance with one or more aspects of the embodiments described herein, there are provided devices and apparatuses for self-timing and/or self-locating in an AP base station. With reference to FIG. 8A, there is provided an exemplary apparatus 800 that may be configured as either an AP base station, or as a processor or similar device for use within an AP base station. As illustrated, apparatus 800 may comprise a means 850 for acquiring SPS signals from a first data source. The SPS signals may comprise SPS time data, SPS frequency data, and/or SPS position data. Apparatus 800 may also include a means 855 for communicating with at least one of (a) an AT, (b) the macro network via the backhaul, (c) a base station in operative communication with the macro network, and (d) an alternative data source such as a second and third data sources. Apparatus 800 may include a backhaul interface 812 to enable communication between the backhaul and a macro network.

The means 855 for communicating (e.g., a transceiver or the like) may download satellite almanac and ephemeris information via the backhaul. The downloaded information may be used by apparatus 800 to assist an SPS receiver or the like estimate at least one of device location and GPS time. The means 855 for communicating may receive at least one of a pilot signal and a sync channel signal from a cell site.

Apparatus 800 may further include a means 860 for determining an SPS time error based on the SPS time data, a means 865 for determining an SPS frequency error based on the SPS frequency data, and a means 870 for determining an SPS position error based on the SPS position data.

Apparatus 800 may further include a means 875 for synchronizing a clock 814 based at least in part on the SPS time data when the SPS time error does not exceed a defined time error threshold. A means 880 for obtaining a frequency reference based at least in part on the SPS frequency data when the SPS frequency error does not exceed a defined frequency error threshold may also be included in apparatus 880.

Figure 8B:
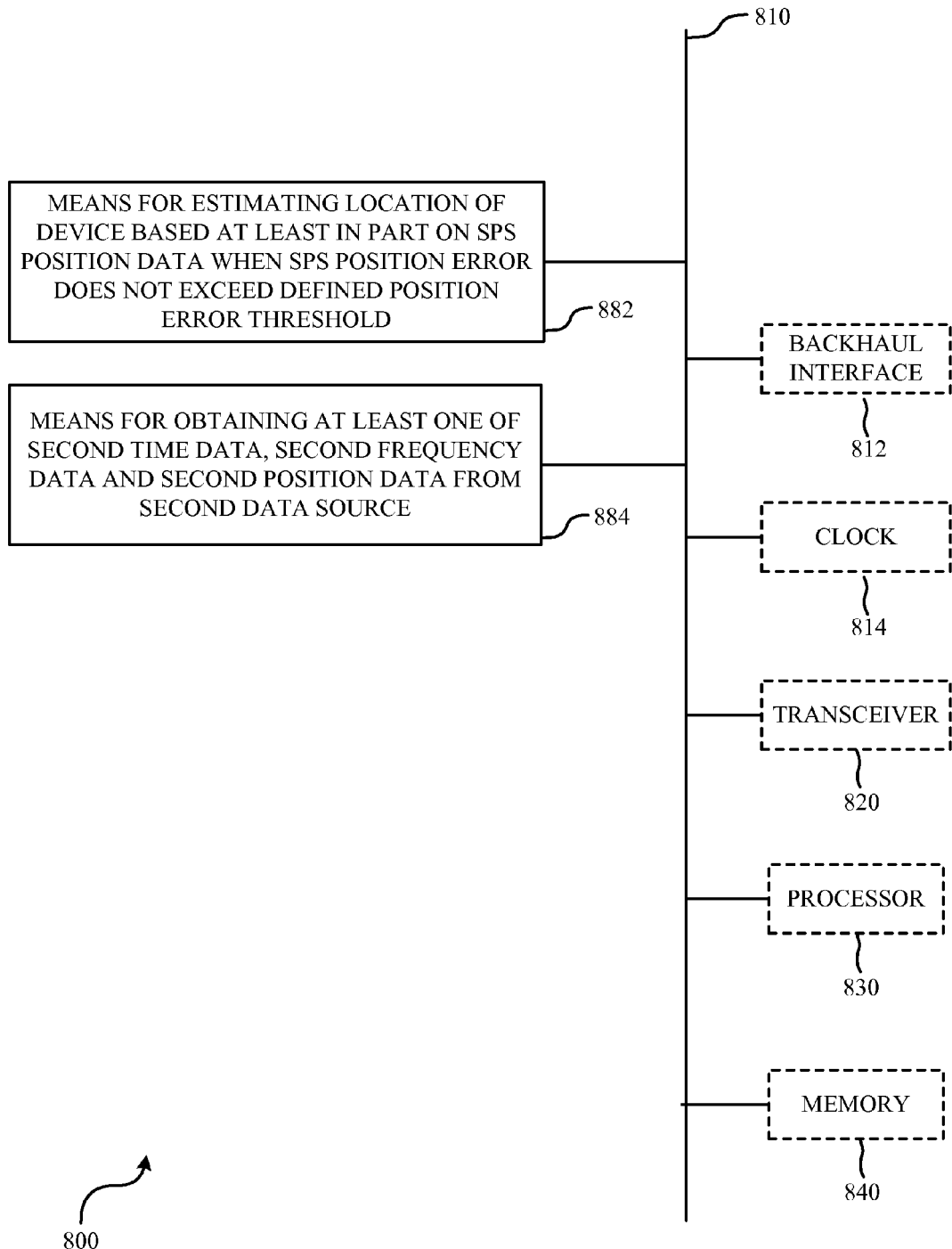

With reference to FIG. 8B, apparatus 800 may include: a means 882 for estimating the location of a device based at least in part on the SPS position data when the SPS position error does not exceed a defined position error threshold; and a means 884 for obtaining at least one of a second time data, a second frequency data and a second position data from a second data source.

Figure 8C:
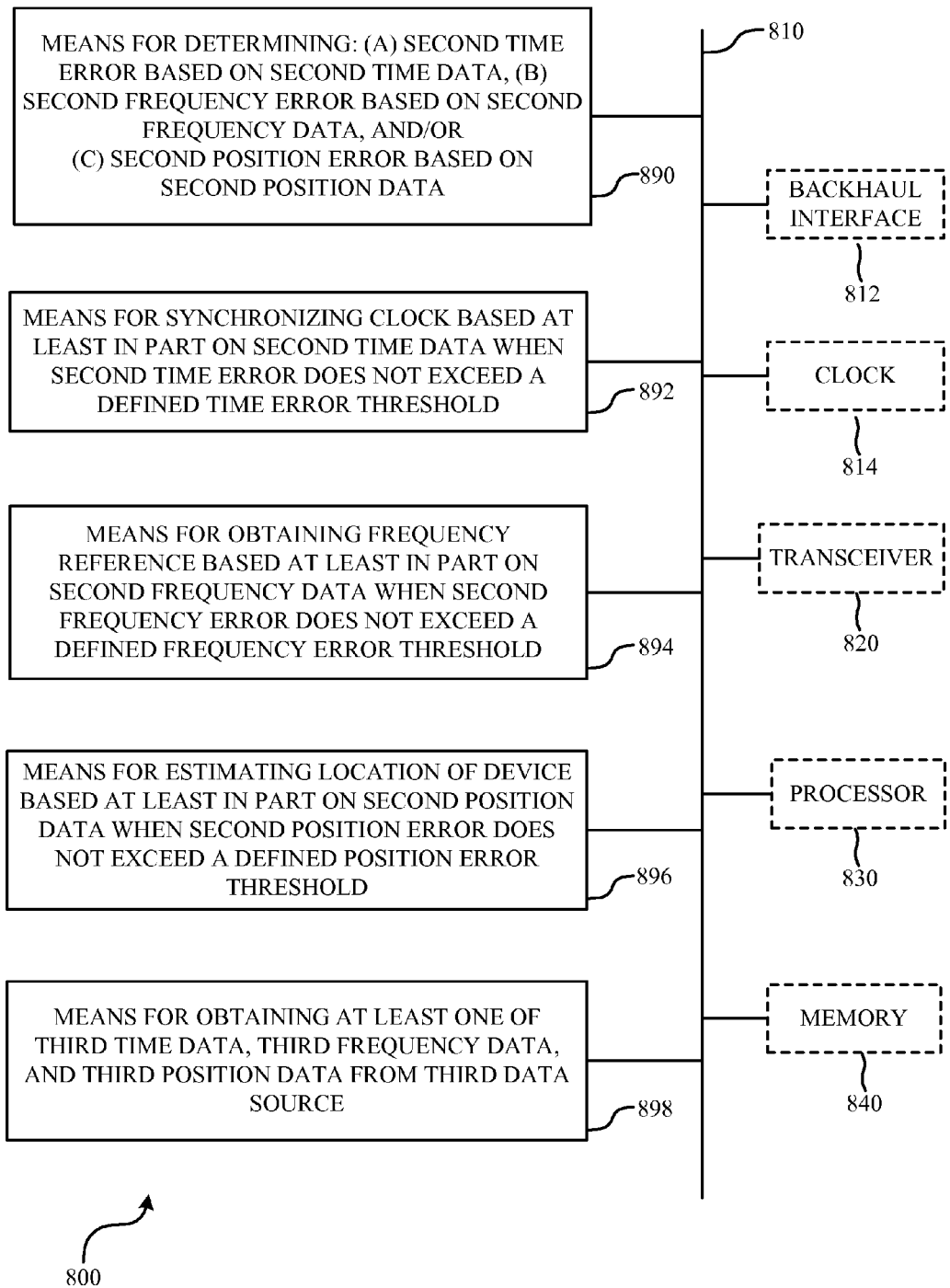
FIG. 8C illustrates sample aspects of the apparatus shown in FIG. 8A.

With reference to FIG. 8C, apparatus 800 may also include a means 890 for determining: (a) a second time error based on the second time data, (b) a second frequency error based on the second frequency data, and (c) a second position error based on the second position data. Further, a means 892 for synchronizing clock 814 based at least in part on the second time data when the second time error does not exceed a defined time error threshold may also be included in apparatus 800.

Apparatus 800 may also include a means 894 for obtaining a frequency reference based at least in part on the second frequency data when the second frequency error does not exceed a defined frequency error threshold. Apparatus 800 may also include a means 896 for estimating the location of a device based at least in part on the second position data when the second position error does not exceed a defined position error threshold. Further, a means 898 for obtaining at least one of a third time data, a third frequency data and a third position data from a third data source may also be included in apparatus 800.

Figure 9A:
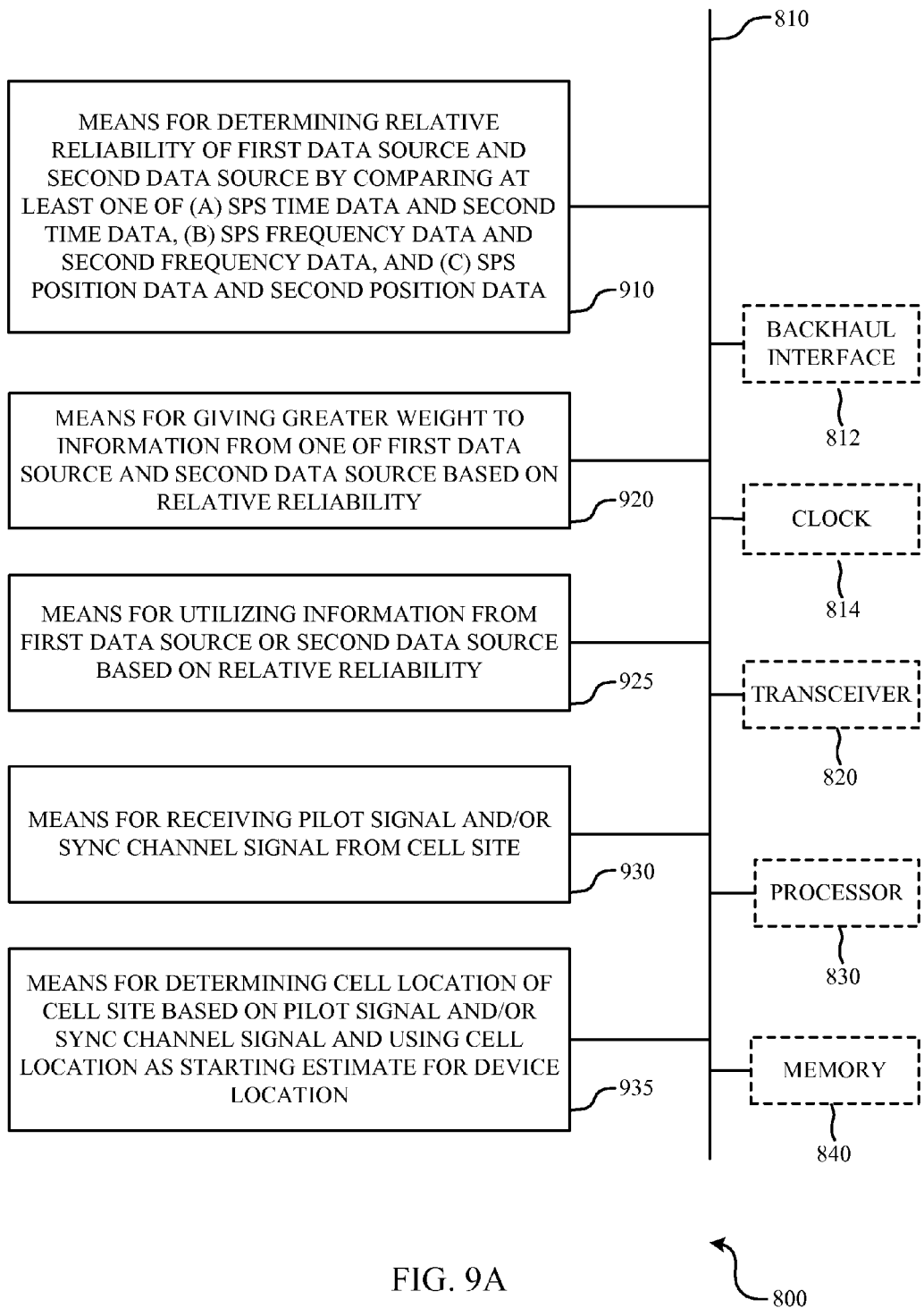
FIGS. 9A-C illustrate sample aspects of an apparatus configured for self-timing and/or self-locating.

With reference to FIG. 9A, apparatus 800 may include a means 910 for determining relative reliability of the first data source and the second data source by comparing at least one of (a) the SPS time data and the second time data, (b) the SPS frequency data and the second frequency data, and (c) the SPS position data and the second position data. A means 920 for giving greater weight to information from one of the first data source and the second data source based on the relative reliability of each of the data sources may also be included in apparatus 800. It is noted that apparatus 800 may also include a means for varying the weight given to information from each of a plurality of data sources based on the relative reliability of each of the data sources.

The first data source may comprise a plurality of satellites of a Global Positioning System (GPS), an Assisted GPS system (A-GPS), or the like. The second data source may comprise a cell site of the macro network, and/or may comprise a terrestrial navigation system, such as, for example, a Long Range Aid to Navigation-C (LORAN-C) system. The second data source may comprise a server in operative communication with the device via the backhaul, and/or may comprise a user input interface through which a user may input data regarding at least one of GPS time, the frequency reference, and the device location.

The server may comprise a Network Time Protocol (NTP) or a Precision Time Protocol (PTP). Additionally, apparatus 800 may be configured to implement advance forward link trilateration (AFLT). The SPS time data may comprise a GPS time stamp included in a GPS signal of the GPS system. The SPS frequency data may comprise a GPS frequency reference included in the GPS signal.

Additionally, the second data source may be an external hardware interface through which external pulse data regarding at least one of GPS time, the frequency reference, and the device location may be received. The third data source may comprise another cell site of the macro network, or any of the data sources described above with respect to the second data source, or variations thereof.

Apparatus 800 may further include a means 925 for utilizing information from the first data source or the second data source based on the relative reliability of each of the data sources. Additionally, apparatus 800 may also selectively utilize information from the second data source or the third data source based on the relative reliability of each of the data sources. A means 930 for receiving at least one of a pilot signal and a sync channel signal from a cell site may also be included in apparatus 800. Further, apparatus 800 may include a means 935 for determining a cell location of the cell site based on at least one of the pilot signal and the sync channel signal, and for using the cell location as a starting estimate for the device location.

Figure 9B:
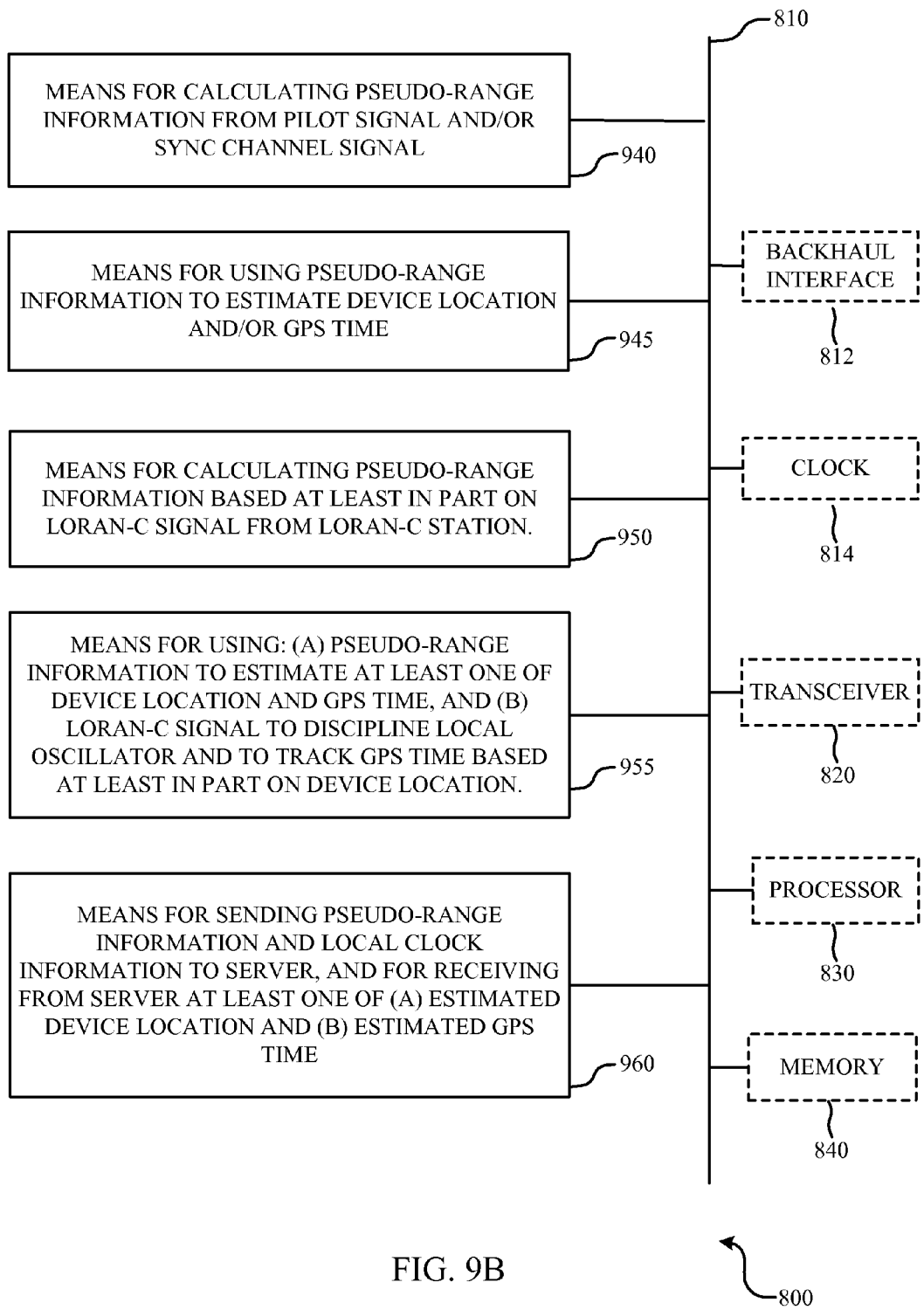

With reference to FIG. 9B, apparatus 800 may include a means 940 for calculating a pseudo-range information from at least one of the pilot signal, the sync channel signal, or the like. A means 945 for using the pseudo-range information to estimate at least one of the device location and a GPS time may also be included in apparatus 800. Further, apparatus 800 may include a means 950 for calculating the pseudo-range information based at least in part on LORAN-C signal from a LORAN-C station.

Apparatus 800 may further include a means 955 for using: (a) the pseudo-range information to estimate at least one of the device location and the GPS time, and (b) the LORAN-C signal to discipline a local oscillator and to track the GPS time based at least in part on the device location. Additionally, apparatus 800 may include a means 960 for sending the pseudo-range information and a local clock information to a server, and for receiving from the server at least one of (a) an estimated device location and (b) an estimated GPS time.

Figure 9C:
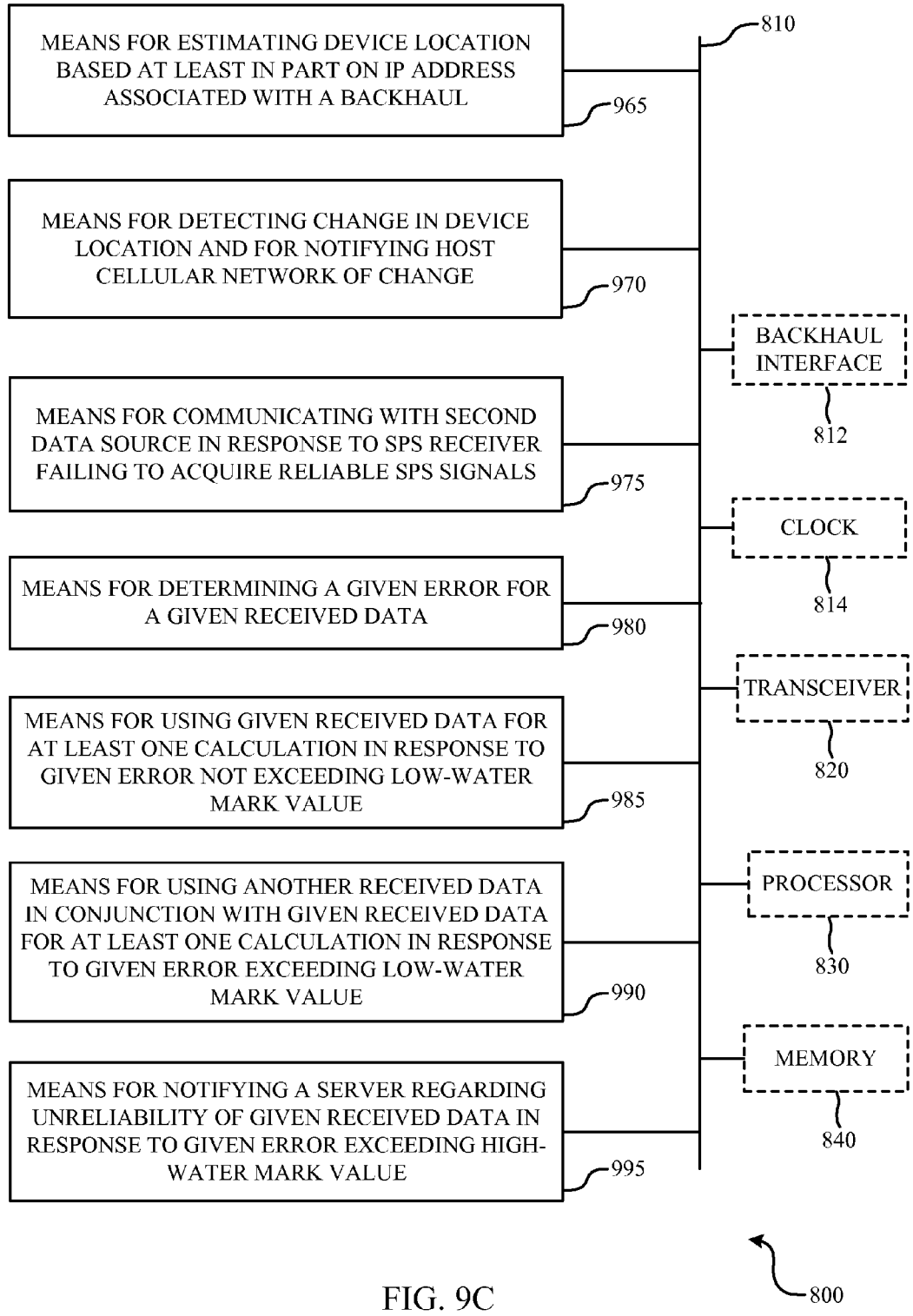

With reference to FIG. 9C, apparatus 800 may include a means 965 for estimating the device location based at least in part on an Internet Protocol (IP) address associated with the backhaul. Apparatus 800 may also include a means 970 for detecting a change in the device location, and for notifying a host cellular network of the change. A means 975 for communicating with the second data source in response to the SPS receiver failing to acquire reliable SPS signals may also be included in apparatus 800. Additionally, apparatus 800 may include a means 980 for determining a given error for a given received data.

Failure by the SPS receiver to acquire reliable SPS signals may comprise at least one of (a) the SPS time error exceeding the time error threshold, (b) the SPS frequency error exceeding the frequency error threshold, and (c) the SPS position error exceeding the position error threshold. In case of a failure, the transceiver module may inform the server of the macro network via the backhaul. The time error threshold, the frequency error threshold, and the position error threshold may comprise a low-water mark value and/or a high-water mark value.

Apparatus 800 may further include a means 985 for using the given received data for at least one calculation in response to a given error not exceeding a low-water mark value. A means 990 for using another received data in conjunction with the given received data for at least one calculation in response to the given error exceeding the low-water mark value may also be included in apparatus 800. Additionally, apparatus 800 may include a means 995 for notifying a server regarding the unreliability of the given received data in response to the given error exceeding a high-water mark value. The given data may comprise at least one of the SPS time data, the SPS frequency data, and the SPS position data.

It is noted that apparatus 800 may optionally include a processor module 830 having at least one processor, in the case of apparatus 800 configured as an AP base station, rather than as a processor. Processor 830, in such case, may be in operative communication with means 850-995, and components thereof, via a bus 810 or similar communication coupling. Processor 830 may effect initiation and scheduling of the processes or functions performed by means 850-995, and components thereof.

In related aspects, apparatus 800 may include a transceiver module 820 for communicating with at least one of (a) an AT, (b) the macro network via the backhaul, (c) a base station (e.g., macro base station or neighboring AP base station) in operative communication with the macro network, and (d) an alternative data source (e.g., cell site, terrestrial navigation station, server, user input interface, etc.). A stand alone receiver and/or stand alone transmitter may be used in lieu of or in conjunction with transceiver 820.

In further related aspects, apparatus 800 may optionally include a means for storing information, such as, for example, a memory device/module 840. Computer readable medium or memory device/module 840 may be operatively coupled to the other components of apparatus 800 via bus 810 or the like. The computer readable medium or memory device 840 may be adapted to store computer readable instructions and data for effecting the processes and behavior of means 850-995, and components thereof, or processor 830 (in the case of apparatus 800 configured as an AP base station) or the methods disclosed herein.

In yet further related aspects, the memory module 840 may optionally include executable code for the processor module 830 to: (a) determine an SPS time error based on the SPS time data, (b) determine an SPS frequency error based on the SPS frequency data, (c) determine an SPS position error based on the SPS position data, (d) synchronize a clock (e.g., clock 814) based at least in part on the SPS time data when the SPS time error does not exceed a defined time error threshold, (e) obtain a frequency reference based at least in part on the SPS frequency data when the SPS frequency error does not exceed a defined frequency error threshold, (f) estimate the location of a device based at least in part on the SPS position data when the SPS position error does not exceed a defined position error threshold, and (g) communicate with an alternative data source via the transceiver module 820. One or more of steps (a)-(g) may be performed by processor module 830 in lieu of or in conjunction with the means 850-995 described above.

Figure 10A:
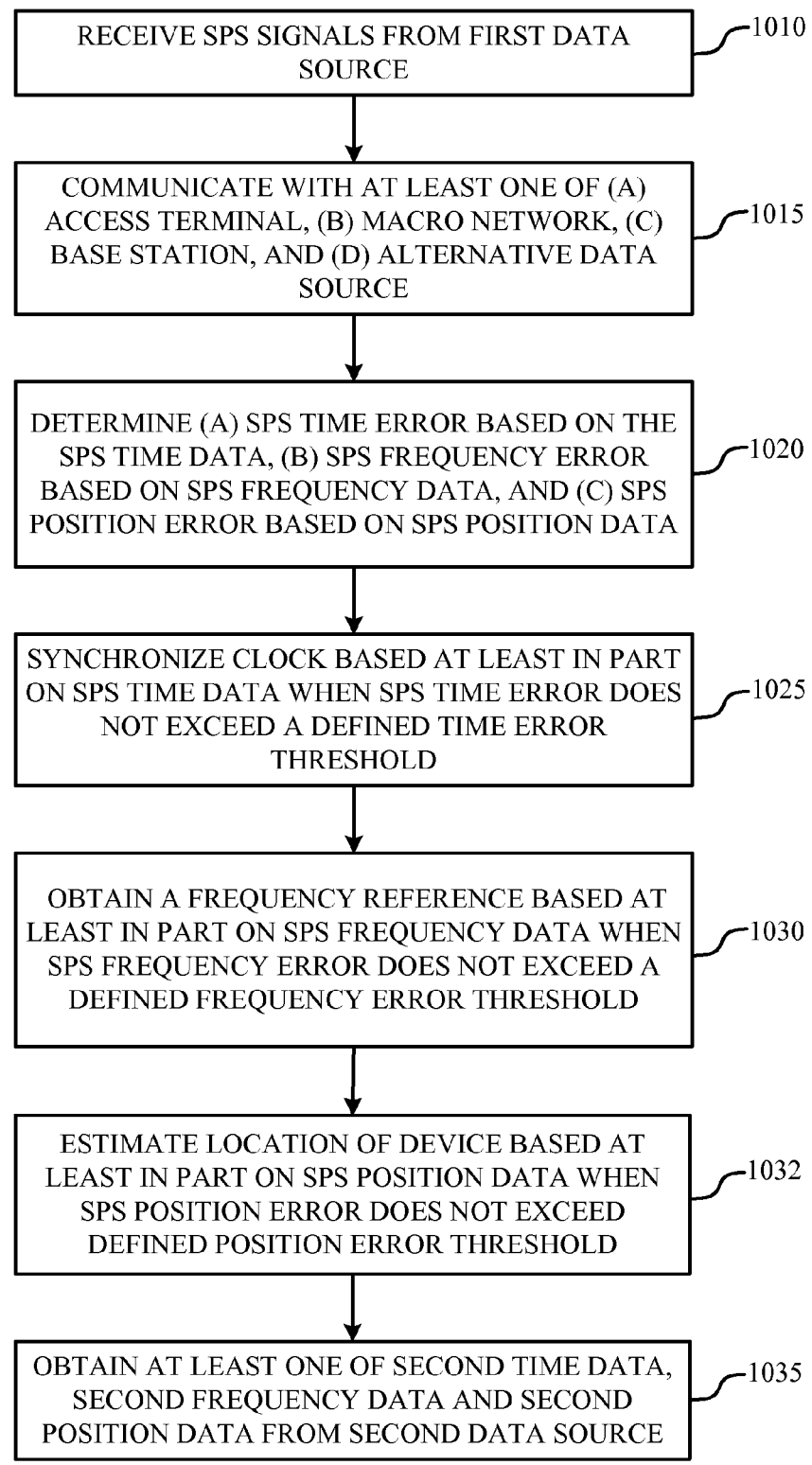
FIG. 10A shows one embodiment for a method for self-timing and/or self-locating by an AP base station.

In accordance with one or more aspects of the embodiments described herein, there are provided methods for facilitating self-timing and self-locating by an AP base station. With reference to FIG. 10A, there is provided an exemplary method 1000 for facilitating self-timing and self-locating that may involve steps 1010-1150 described below. At step 1010, SPS signals from the first data source are received. At step 1015, method 1000 involves communicating with at least one of (a) an access terminal, (b) a macro network, (c) a base station, and (d) an alternative data source (e.g., second and third data sources). At step 1020, one or more of the following items may be determined: (a) the SPS time error based on the SPS time data, (b) the SPS frequency error based on the SPS frequency data, and (c) the SPS position error based on the SPS position data.

At step 1025, an internal clock may be synchronized based at least in part on the SPS time data when the SPS time error does not exceed a defined time error threshold. At step 1030, the frequency reference may be obtained based at least in part on the SPS frequency data when the SPS frequency error does not exceed a defined frequency error threshold. Method 1000 may include step 1032 where the location of the device may be estimated based at least in part on the SPS position data when the SPS position error does not exceed a defined position error threshold. At step 1035, at least one of the second time data, the second frequency data and the second position data may be obtained from the second data source.

Figure 10B:
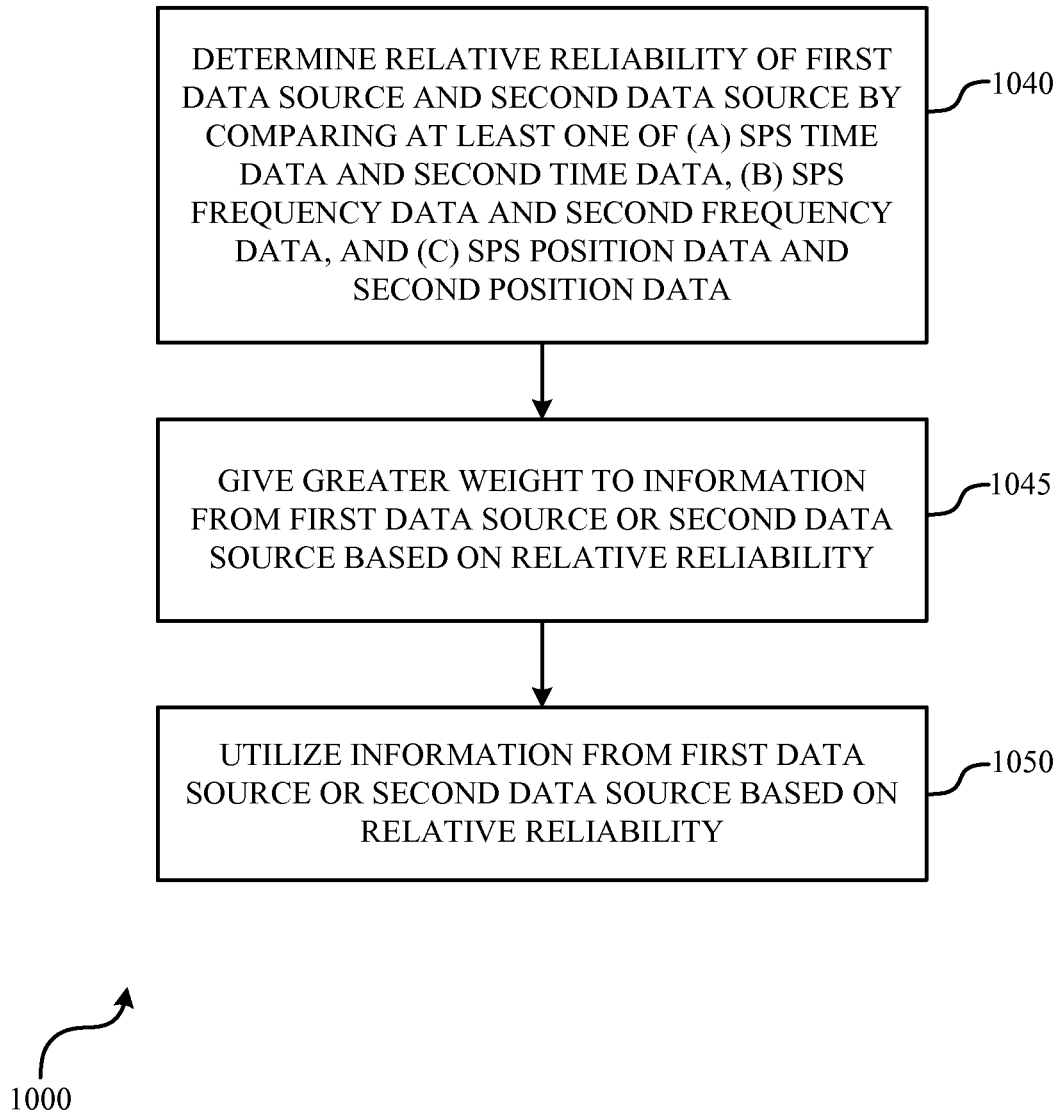
FIGS. 10B-D show sample aspects of the method shown in FIG. 10A.

With reference to FIG. 10B, at step 1040, the relative reliability of first data source and second data source may be obtained by comparing at least one of: (a) the SPS time data and the second time data, (b) the SPS frequency data and the second frequency data, and (c) the SPS position data and the second position data. At step 1045, information from one of the first data source or the second data source may be given a greater weight based on the relative reliability of each of the data sources. At step 1050, information from a selected one of the first data source and the second data source may be utilized based on the relative reliability of each of the data sources.

Figure 10C:
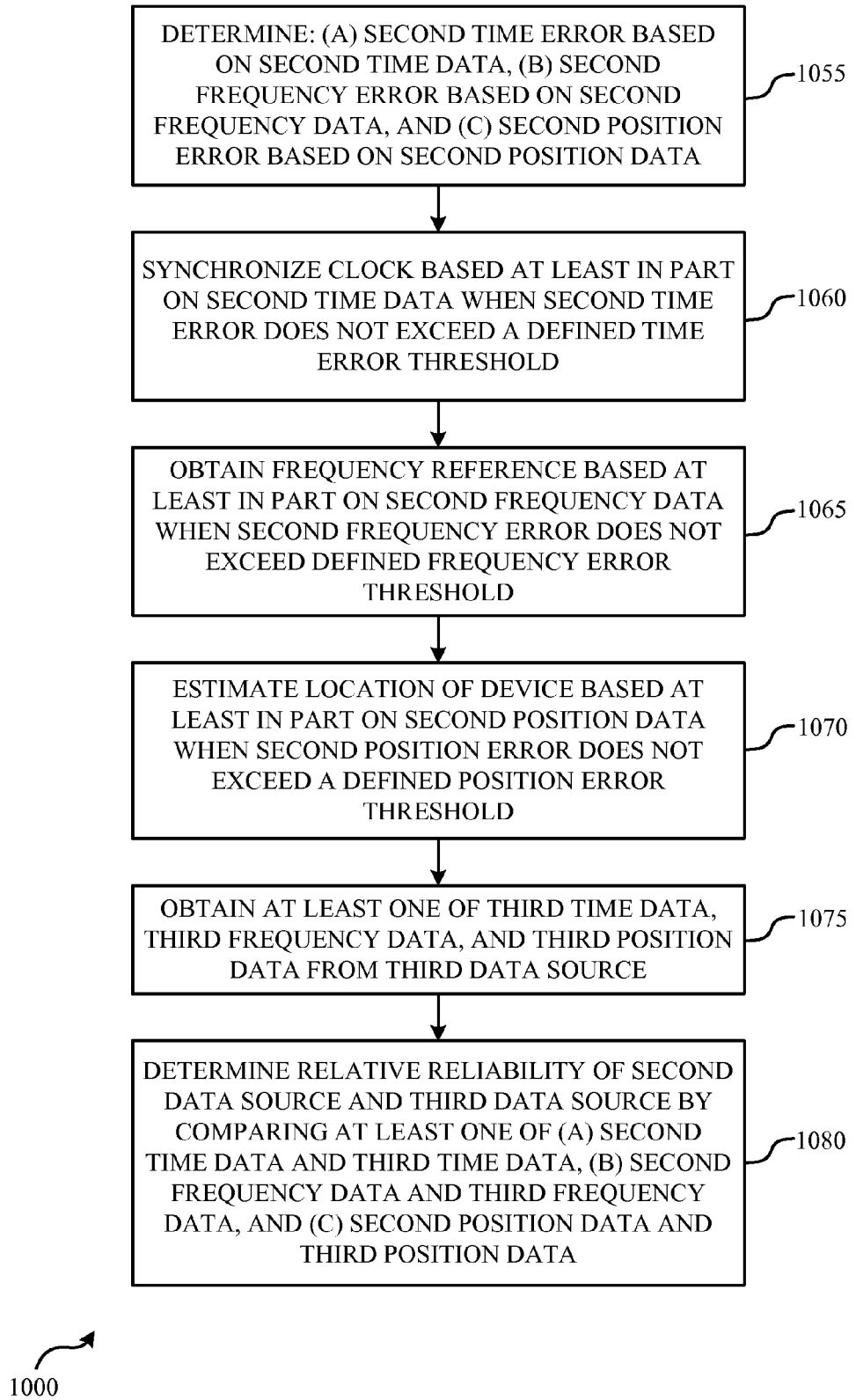

With reference to FIG. 10C, method 1000 continues at step 1055 where the following items may be determined: (a) the second time error based on the second time data, (b) the second frequency error based on the second frequency data, and (c) the second position error based on the second position data. At step 1060, the clock may be synchronized based at least in part on the second time data when the second time error does not exceed a defined time error threshold. At step 1065, the frequency reference may be obtained based at least in part on the second frequency data when the second frequency error does not exceed a defined frequency error threshold.

At step 1070, the location of device may be estimated based at least in part on the second position data when the second position error does not exceed a defined position error threshold. At step 1075, at least one of the third time data, a third frequency data and a third position data may be obtained from the third data source. At step 1080, the relative reliability of first data source and second data source may be determined by comparing at least one of (a) the SPS time data and the second time data, (b) the SPS frequency data and the second frequency data, and (c) the SPS position data and the second position data.

Figure 10D:
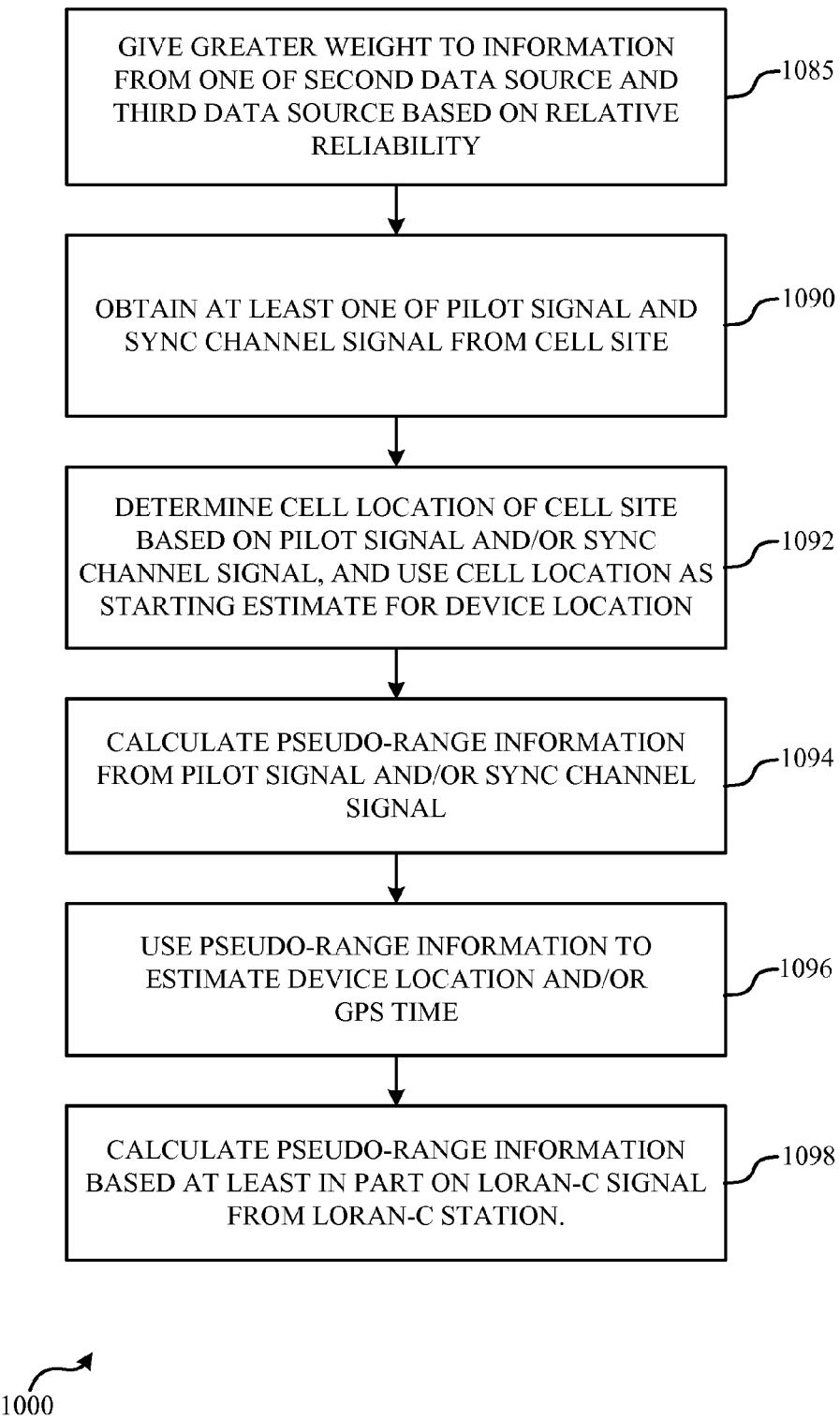

With reference to FIG. 10D, method 1000 continues at step 1085 where information from one of the second data source and the third data source may be given greater weight based on the relative reliability of each of the data sources. At step 1090, at least one of a pilot signal and a sync channel signal from a cell site is obtained. At step 1092, a cell location of the cell site based on at least on one of the pilot signal and the sync channel signal may be determined. The estimated cell location may then be used as a starting estimate for the device location.

At step 1094, pseudo-range information may be calculated from at least one of the pilot signal and the sync channel signal. At step 1096, the pseudo-range information may be used to estimate at least one of the device location and the GPS time. At step 1098, the pseudo-range information may be calculated based at least in part on a LORAN-C signal from a LORAN-C station.

Figure 11A:
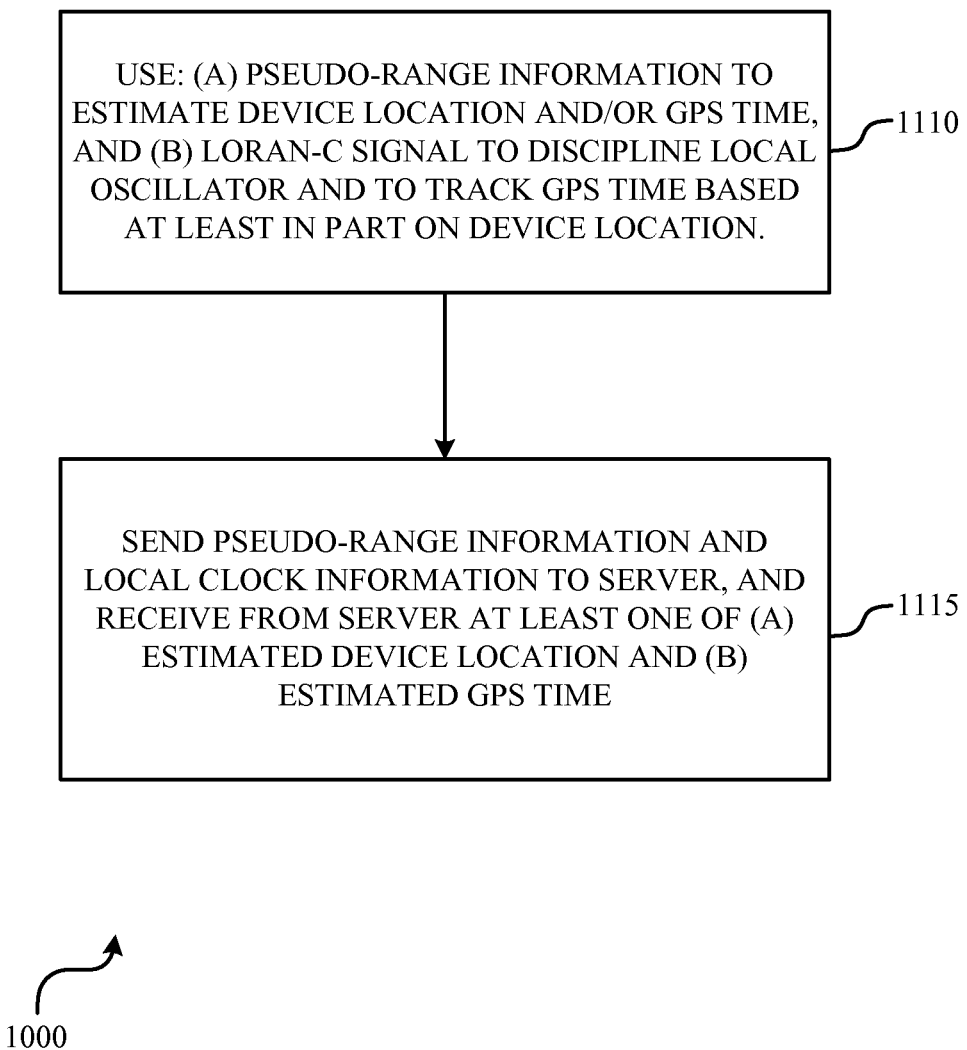
FIGS. 11A-B show sample aspects of a method for self-timing and/or self-locating by an AP base station.

With reference to FIG. 11A, method 1000 continues at step 1110 where (a) a pseudo-range information may be used to estimate at least one of the device location and the GPS time, and/or (b) a LORAN-C signal may be used to discipline a local oscillator and to track the GPS time based at least in part on the device location. At step 1115, the pseudo-range information and local clock information may be sent to the server, and at least one of (a) the estimated device location and (b) the estimated GPS time may be received from the server.

Figure 11B:
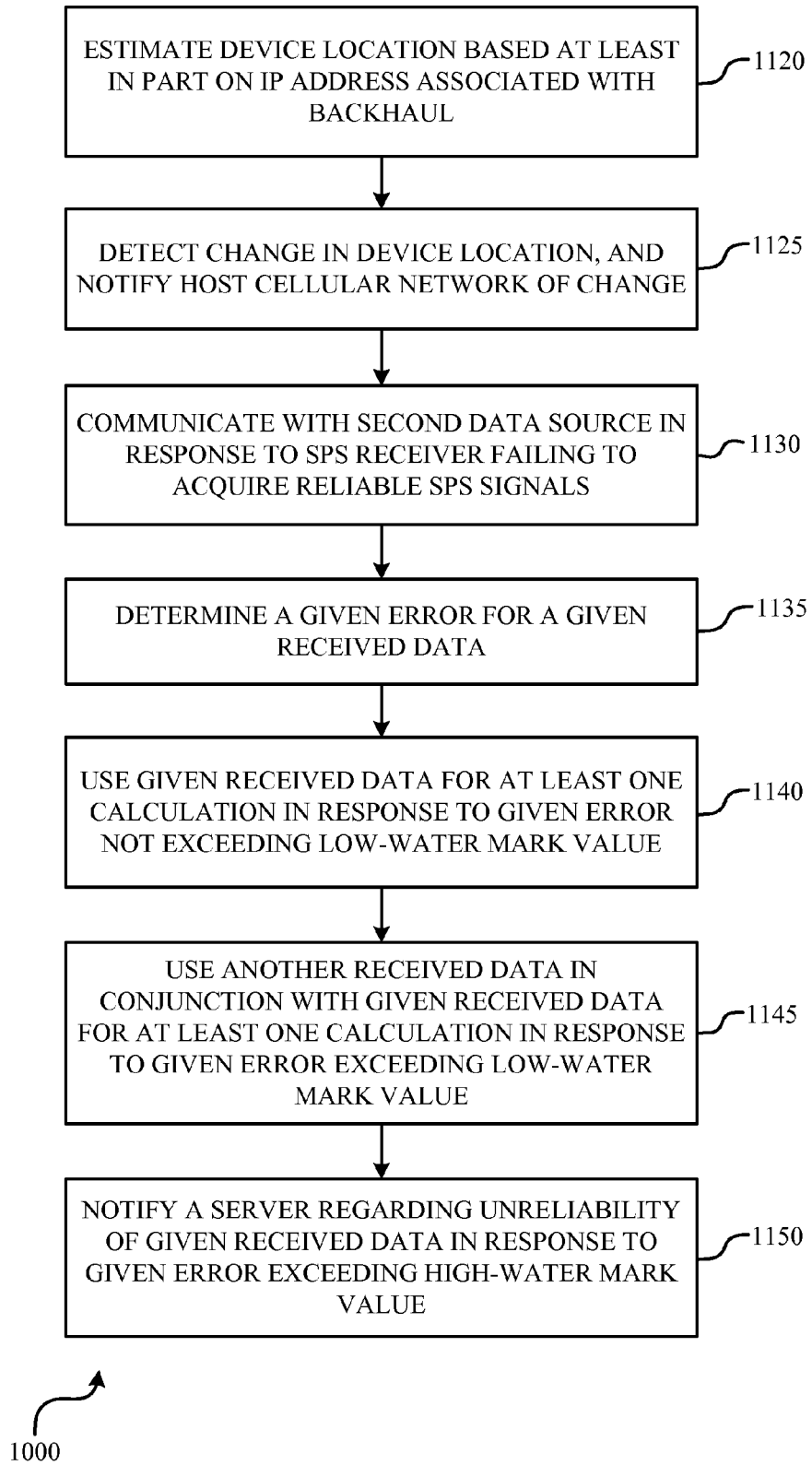

With reference to FIG. 11B, method 1000 continues at step 1120 where the device location may be estimated based at least in part on an Internet Protocol (IP) address associated with the backhaul. At step 1125, the host cellular network may be notified when a change in the device location is detected. At step 1130, in response to the SPS receiver failing to acquire reliable SPS signals, communication may be established with an alternative data source (e.g., second data source). At step 1135, a given error for a given received data is determined. At step 1140, the given received data may be used for at least one calculation in response to the given error not exceeding a low-water mark value. At step 1145, another received data in conjunction with given received data may be used for at least one calculation in response to the given error exceeding a low-water mark value. At step 1150, a server may be notified regarding the unreliability of the given received data in response to the given error exceeding a high-water mark value.

While this application describes particular examples of the present invention, those of ordinary skill can devise variations of the present invention without departing from the inventive concept. For example, the teachings herein refer to circuit-switched network elements but are equally applicable to packet-switched domain network elements. It is noted that the word "exemplary" is used herein to mean "serving as an example, instance, or illustration." Any embodiment described herein as "exemplary" is not necessarily to be construed as preferred or advantageous over other embodiments.

It will be appreciated that, in accordance with one or more aspects described herein, inferences can be made regarding determining communication parameters for a plurality of surrounding femto cells and/or macro cells as described. As used herein, the term to "infer," or "inference," refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the internet with other systems by way of the signal).

It is understood that the specific order or hierarchy of steps in the processes disclosed herein in an example of exemplary approaches. Based upon design preferences, it is understood that the specific order or hierarchy of steps in the processes may be rearranged while remaining within the scope of the present disclosure. The accompanying method claims present elements of the various steps in sample order, and are not meant to be limited to the specific order or hierarchy presented.

Those skilled in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those skilled in the art will further appreciate that the various illustrative logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Furthermore, various embodiments are described herein in connection with a mobile device. A mobile device can also be called a system, subscriber unit, subscriber station, mobile station, mobile, remote station, remote terminal, Access Terminal (AT), user terminal, terminal, wireless communication device, user agent, user device, or User Equipment (UE). A mobile device can be a cellular telephone, a cordless telephone, a Session Initiation Protocol (SIP) phone, a Wireless Local Loop (WLL) station, a Personal Digital Assistant (PDA), a handheld device having wireless connection capability, computing device, or other processing device connected to a wireless modem. Moreover, various embodiments are described herein in connection with a base station. A base station can be utilized for communicating with mobile device(s) and can also be referred to as an access point, Node B, evolved Node B (eNode B or eNB), base transceiver station (BTS) or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., Erasable Programmable Read Only Memory (EPROM), card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

The techniques described herein may be used for various wireless communication systems such as Code Division Multiple Access (CDMA), Multiple-Carrier CDMA (MC-CDMA), Wideband CDMA (W-CDMA), High-Speed Packet Access (HSPA, HSPA+), Time Division Multiple Access (TDMA), Frequency Division Multiple Access (FDMA), Orthogonal Frequency Division Multiple Access (OFDMA), Single Carrier Frequency Domain Multiplexing (SC-FDMA) and other multiple access systems/techniques. The terms "system" and "network" may be used interchangeably. A CDMA system may implement a radio technology such as Universal Terrestrial Radio Access (UTRA), CDMA2000, etc. UTRA may include W-CDMA and/or other variants of CDMA. CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). CDMA2000 and UMB are described in documents from an organization named "3rd Generation Partnership Project 2" (3GPP2). It is further noted that the wireless communication system described herein may implement one or more standards, such as, for example, IS-95, CDMA2000, IS-856, W-CDMA, TD-SCDMA, etc.

The various illustrative logical blocks, modules, and circuits described in connection with the examples disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the examples disclosed herein may be embodied directly in hardware, in a software module executed by a processor, or in a combination of the two. A software module may reside in Random Access Memory (RAM), flash memory, Read-Only Memory (ROM), EPROM, Electrically Erasable Programmable Read-Only Memory (EEPROM), registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed examples is provided to enable any person skilled in the art to make or use the present invention. Various modifications to these examples will be readily apparent to those skilled in the art, and the generic principles defined herein may be applied to other examples without departing from the spirit or scope of the invention. Thus, the present invention is not intended to be limited to the examples shown herein but is to be accorded the widest scope consistent with the principles and novel features disclosed herein.

What is claimed is:

1. A wireless communication device, comprising:
   a Satellite Positioning System (SPS) receiver for acquiring SPS signals from a first data source, the SPS signals comprising SPS time data, SPS frequency data, and SPS position data;
   a backhaul interface for a communication backhaul in operative communication with a macro network;
   a transceiver module for communicating with at least one of (a) an access terminal (AT), (b) the macro network via the communication backhaul, (c) a base station in operative communication with the macro network, and (d) an alternative data source;
   an internal clock;
   at least one processor operatively coupled with the SPS receiver, the backhaul interface, the transceiver module, and the internal clock; and
   a memory module operatively coupled with the at least one processor and comprising executable code for the at least one processor to:
   determine an SPS time error based on the SPS time data;
   determine an SPS frequency error based on the SPS frequency data;
   determine an SPS position error based on the SPS position data;
   obtain a time error threshold, a frequency error threshold, and a position error threshold, wherein at least one of the time error threshold, the frequency error threshold, and the position error threshold comprises both a low water mark value and a high water mark value;
   in response to the SPS time error not exceeding the time error threshold, synchronize the internal clock based at least in part on the SPS time data;
   in response to the SPS frequency error not exceeding the frequency error threshold, obtain a frequency reference based at least in part on the SPS frequency data;
   in response to the SPS position error not exceeding the position error threshold, estimate a location of the device based at least in part on the SPS position data; and
   communicate with a second data source via the transceiver module to obtain at least one of second time data, second frequency data and second position data,
   wherein the at least one processor is further configured to:
   in response to one of the time error, frequency error and position error exceeding the low water mark value, a first defined action, and
   in response to one of the time error, frequency error and position error exceeding the high water mark, perform a second defined action.

2. The device of claim 1, wherein the at least one processor determines a relative reliability of the first data source and the second data source by comparing at least one of (i) the SPS time data and the second time data, (ii) the SPS frequency data and the second frequency data, and (iii) the SPS position data and the second position data.

3. The device of claim 2, wherein the at least one processor gives a greater weight to information from one of the first data source and the second data source based on the relative reliability.

4. The device of claim 2, wherein the at least one processor utilizes information from a selected one of the first data source and the second data source based on the relative reliability.

5. The device of claim 1, wherein the at least one processor:
   determines a second time error based on the second time data;
   determines a second frequency error based on the second frequency data;
   determines a second position error based on the second position data;
   in response to the second time error not exceeding the time error threshold, synchronizes the internal clock based at least in part on the second time data;
   in response to the second frequency error not exceeding the frequency error threshold, obtains the frequency reference based at least in part on the second frequency data;
   in response to the second position error not exceeding the position error threshold, estimates the location of the device based at least in part on the second position data; and
   communicates with a third data source via the transceiver module to obtain at least one of third time data, third frequency data and third position data from the third data source.

6. The device of claim 5, wherein the at least one processor determines a relative reliability of the second data source and the third data source by comparing at least one of (i) the second time data and the third time data, (ii) the second frequency data and the third frequency data, and (iii) the second position data and the third position data.

7. The device of claim 6, wherein the at least one processor gives a greater weight to information from one of the second data source and the third data source based on the relative reliability.

8. The device of claim 6, wherein the at least one processor utilizes information from a selected one of the second data source and the third data source based on the relative reliability.

9. The device of claim 6, wherein the second data source comprises a cell site of the macro network, and the third data source comprises another cell site of the macro network.

10. The device of claim 1, wherein the first data source comprises a plurality of satellites of a Global Positioning Satellite (GPS) system.

11. The device of claim 10, wherein:
the SPS time data comprises a GPS time stamp included in a GPS signal of the GPS system; and
the SPS frequency data comprises a GPS frequency reference included in the GPS signal.

12. The device of claim 1, wherein the first data source comprises an Assisted GPS (A-GPS) system.

13. The device of claim 12, wherein:
the transceiver module downloads satellite almanac and ephemeris information via the communication backhaul; and
the at least one processor uses the downloaded information to assist the SPS receiver estimate at least one of the location of the device and GPS time.

14. The device of claim 1, wherein the second data source comprises a cell site of the macro network.

15. The device of claim 14, wherein the transceiver module receives at least one of a pilot signal and a sync channel signal from the cell site.

16. The device of claim 15, wherein the at least one processor;
determines a cell location of the cell site based on the at least one of the pilot signal and the sync channel signal; and
uses the cell, location as a starting estimate for the location of the device.

17. The device of claim 15, wherein the at least one processor calculates pseudo-range information from at least one of the pilot signal and the sync channel signal.

18. The device of claim 17, wherein the at least one processor uses the pseudo-range information to estimate at least one of the location of the device and GPS time.

19. The device of claim 1, wherein the second data source comprises a terrestrial navigation system.

20. The device of claim 19, wherein the terrestrial navigation system comprises a Long Range Aid to Navigation-C (LORAN-C) system.

21. The device of claim 20, wherein the at least one processor calculates pseudo-range information based at least in part on a LORAN-C signal from a LORAN-C station.

22. The device of claim 21, wherein the at least one processor:
uses the pseudo-range information to estimate at least one of the location of the device and GPS time; and
uses the LORAN-C signal to discipline a local oscillator and to track GPS time based at least in part on the location of the device.

23. The device of claim 1, wherein the second data source comprises a server in operative communication with the device via the communication backhaul.

24. The device of claim 23, wherein the server comprises at least one of Network Time Protocol (NTP) and Precision Time Protocol (PTP).

25. The device of claim 24, wherein the transceiver module:
sends pseudo-range information and local clock information to the server via the communication backhaul; and
receives from the server at least one of (a) an estimated device location and (b) an estimated GPS time, wherein the at least one of the estimated device location and the estimated GPS time are based at least in part on the pseudo-range information and the local clock information.

26. The device of claim 25, wherein the at least one processor implements advanced forward link trilateration (AFLT).

27. The device of claim 1, wherein the second data source comprises a user input interface configured to receive a user input data regarding at least one of GPS time, the frequency reference, and the location of the device.

28. The device of claim 1, wherein the second data source comprises an external hardware interface configured to receive external pulse data regarding at least one of GPS time, the frequency reference, and the location of the device.

29. The device of claim 28, wherein the external pulse data comprises a pulse-per-2-seconds (PP2S) signal injected into a general purpose input/output (GPIO) port in operative communication with the transceiver module.

30. The device of claim 1, wherein the at least one processor estimates the location of the device based at least in port on an Internet Protocol (IP) address associated with the communication backhaul.

31. The device of claim 1, wherein the at least one processor, in response to detecting a change in the location of the device, notifies a host cellular network of the change.

32. The device of claim 1, wherein the at least one processor communicates with the second data source in response to the SPS receiver failing to acquire reliable SPS signals.

33. The device of claim 32, wherein a failure by the SPS receiver to acquire reliable SPS signals comprises at least one of (i) the SPS time error, (ii) the SPS frequency error, and (iii) the SPS position error exceeding the low or high water mark values.

34. The device of claim 32, wherein the transceiver module informs a server of the macro network, via the communication backhaul, of a failure by the SPS receiver to acquire reliable SPS signals.

35. The device of claim 1, wherein the first defined action at least comprises using another received data in conjunction with the received data for at least one calculation.

36. The device of claim 1, wherein the second defined action at least comprises notifying a server of the macro network regarding unreliability of the received data.

37. The device of claim 1, wherein at least a portion of the received data comprises at least one of the SPS time data, the SPS frequency data, and the SPS position data.

38. The device of claim 1, wherein the base station comprises one of a macro base station and an AP base station.

39. A method for facilitating self-timing and self-locating by an AP base station, comprising:
receiving SPS signals from a first data source, the SPS signals comprising SPS time data, SPS frequency data, and SPS position data;
interfacing with a communication backhaul in operative communication with a macro network;
communicating with at least one of (a) an access terminal (AT), (b) the macro network via the communication backhaul, (c) a base station in operative communication with the macro network, and (d) an alternative data source;
determining an SPS time error based on the SPS time data;
determining an SPS frequency error based on the SPS frequency data;
determining an SPS position error based on the SPS position data;
obtaining a time error threshold, a frequency error threshold, and a position error threshold, wherein at least one of the time error threshold, the frequency error threshold and the position error threshold comprises both a low water mark value and a high water mark value;

synchronizing an internal clock based at least in part on the SPS time data, in response to the SPS time error not exceeding the time error threshold;

obtaining a frequency reference based at least in part on the SPS frequency data, in response to the SPS frequency error not exceeding the frequency error threshold;

estimating a location of the AP base station based at least in part on the SPS position data, in response to the SPS position error not exceeding the position error threshold;

obtaining from a second data source at least one of second time data, second frequency data and second position data;

in response to one of the time error frequency error and position error exceeding the low water mark value, performing a first defined action; and in response to one of the time error, frequency error and position error exceeding the high water mark, performing is second defined action.

40. The method of claim 39, further comprising determining a relative reliability of the first data source and the second data source by comparing at least one of (i) the SPS time data and the second time data, (ii) the SPS frequency data and the second frequency data, and (iii) the SPS position data and the second position data.

41. The method of claim 40, further comprising giving a greater weight to information from one of the first data source and the second data source based on the relative reliability.

42. The method of claim 40, further comprising utilizing information from a selected one of the first data source and the second data source based on the relative reliability.

43. The method of claim 39, further comprising:
determining a second time error based on the second time data;
determining a second frequency error based on the second frequency data;
determining a second position error based on the second position data;
in response to the second time error not exceeding the time error threshold, synchronizing the internal clock based at least in part on the second time data;
in response to the second frequency error not exceeding the frequency error threshold, obtaining the frequency reference based at least in part on the second frequency data;
in response to the second position error not exceeding the position error threshold, estimating the location of the AP base station based at least in part on the second position data; and
communicating with a third data source via the transceiver module to obtain at least one of third time data, third frequency data and third position data from the third data source.

44. The method or claim 43, further comprising determining a relative reliability of the second data source and the third data source by comparing at least one of (i) the second time data and the third time data, (ii) the second frequency data and the third frequency data, and (iii) the second position data and the third position data.

45. The method of claim 44, further comprising giving a greater weight to information from one of the second data source and the third data source based on the relative reliability.

46. The method of claim 44, further comprising utilizing information from a selected one of the second data source and the third data source based on the relative reliability.

47. The method of claim 39, wherein obtaining from the second data source comprises obtaining from a cell site of the macro network.

48. The method of claim 47, wherein obtaining from the cell site comprises receiving at least one of a pilot signal and a sync channel signal from the cell site.

49. The method of claim 48, further comprising:
determining a cell location of the cell site based on the at least one of the pilot signal and the sync channel signal; and
using the cell location as a starting estimate for the location of the AP base station.

50. The method of claim 48, further comprising calculating pseudo-range information from at least one of the pilot signal and the sync channel signal.

51. The method of claim 39, wherein obtaining from the second data source comprises obtaining from a Long Range Aid to Navigation-C (LORAN-C) system.

52. The method of claim 51, further comprising:
calculating pseudo-range information based at least in part on LORAN-C signal from a LORAN-C station;
using the pseudo-range information to estimate at least one of the location of the AP base station and GPS time; and
using the LORAN-C signal to discipline a local oscillator and to track GPS time based at least in part on the location of the AP base station.

53. The method of claim 39, wherein obtaining from the second data source comprises obtaining from a server via the communication backhaul.

54. The method of claim 53, further comprising:
sending pseudo-range information and local clock information to the server via the communication backhaul; and
receiving from the server at least one of (a) an estimated device location and (b) an estimated GPS time, wherein the at least one of the estimated device location and the estimated GPS time are based at least in part on the pseudo-range information and the local clock information.

55. The method of claim 54, further comprising implementing advanced forward link trilateration (AFLT).

56. The method of claim 39, wherein obtaining from the second data source comprises obtaining from a user input interface configured to receive a user input data regarding at least one of GPS time, the frequency reference, and the location of the AP base station.

57. The method of claim 39, wherein performing the first action comprises using another received data in conjunction with the received data for at least one calculation.

58. The method of claim 39, wherein performing the second action comprises notifying a server of the macro network regarding unreliability of the received data.

59. A wireless communication apparatus, comprising:
means for receiving SPS signals from a first data source, the SPS signals comprising SPS time data, SPS frequency data, and SPS position data;
means for interfacing with a communication backhaul in operative communication with a macro network;
means for communicating with at least one of (a) an access terminal (AT), (b) the macro network via the communication backhaul, (c) a base station in operative communication with the macro network, and (d) an alternative data source;

means for determining an SPS time error based on the SPS time data;

means for determining an SPS frequency error based on the SPS frequency data;

means for determining an SPS position error based on the SPS position data;

means for obtaining a time error threshold, a frequency error threshold, and a position error threshold wherein at least one of the time error threshold, the frequency error threshold, and the position error threshold comprises both a low water mark value and a high water mark value;

means for synchronizing an internal clock based at least in part on the SPS time data, in response to the SPS time error not exceeding the time error threshold;

means for obtaining a frequency reference based at least in part on the SPS frequency data in response to the SPS frequency error not exceeding the frequency error threshold;

means for estimating a location of the apparatus based at least in part on the SPS position data in response to the SPS position error not exceeding the position error threshold;

means for obtaining from a second data source at least one of second time data, second frequency data and second position data;

in response to one of the time error, frequency error and position error exceeding the low water mark value, means for first defined action; and in response to one of the time error, frequency error and position error exceeding the high water mark, means for performing a second defined action.

60. The apparatus of claim 59, further comprising means for determining a relative reliability of the first data source and the second data source by comparing at least one of (i) the SPS time data and the second time data, (ii) the SPS frequency data and the second frequency data, and (iii) the SPS position data and the second position data.

61. The apparatus of claim 60, wherein at least one of the means for synchronizing the internal clock, the means for obtaining the frequency reference, and the means for estimating the location of the apparatus gives a greater weight to information from one of the first data source and the second data source based on the relative reliability.

62. The apparatus of claim 60, wherein at least one of the means for synchronizing the internal clock, the means for obtaining the frequency reference, and the means for estimating the location of the apparatus utilizes information from a selected one of the first data source and the second data source based on the relative reliability.

63. The apparatus of claim 59, further comprising:

means for determining a second time error based on the second time data;

means for determining a second frequency error based on the second frequency data;

means for determining a second position error based on the second position data;

means for synchronizing an internal clock based at least in part on the second time data in response to the second time error not exceeding the time error threshold;

means for obtaining the frequency reference based at least in part on the second frequency data in response to the second frequency error not exceeding the frequency error threshold;

means for estimating the location of the apparatus based at least in part on the second position data in response to the second position error not exceeding the position error threshold; and means for communicating with a third data source via the transceiver module to obtain at least one of third time data, third frequency data and third position data from the third data source.

64. The apparatus of claim 63, further comprising means for determining a relative reliability of the second data source and the third data source by comparing at least one of (i) the second time data and the third time data, (ii) the second frequency data and the third frequency data, and (iii) the second position data and the third position data.

65. The apparatus of claim 59, wherein the second data source comprises a cell site of the macro network.

66. The apparatus of claim 65, wherein the means for obtaining from the second data source receives at least one of a pilot signal and a sync channel signal from the cell site.

67. The apparatus of claim 59, wherein the second data source comprises a Long Range Aid to Navigation-C (LORAN-C) system.

68. The apparatus of claim 59, wherein the second data source comprises a server in operative communication with the apparatus via the means for communicating.

69. The apparatus of claim 68, wherein the means for communicating:

sends pseudo-range information and local clock information to the server via the communication backhaul; and receives from the server at least one of (a) an estimated device location and (b) an estimated GPS time, wherein the at least one of the estimated device location and the estimated GPS time are based at least in part on the pseudo-range information and the local clock information.

70. The apparatus of claim 69, further comprising means for implementing advanced forward link trilateration (AFLT).

71. The apparatus of claim 59, wherein the second data source comprises a user input interface configured to receive a user input data regarding at least one of GPS time, the frequency reference, and the location of the apparatus.

72. A computer program product, comprising:

a non-transitory computer-readable medium comprising:

code for causing a computer to receive SPS signals from a first data source, the SPS signals comprising SPS time data, SPS frequency data, and SPS position data;

code for causing the computer to interface with a communication backhaul in operative communication with a macro network;

code for causing the computer to communicate with at least one of (a) an access terminal (AT), (b) the macro network via the communication backhaul, (c) a base station in operative communication with the macro network, and (d) an alternative data source;

code for causing the computer to determine an SPS time error based on the SPS time data;

code for causing the computer to determine an SPS frequency error based on the SPS frequency data;

code for causing the computer to determine an SPS position error based on the SPS position data:

code for causing the computer to obtain a time error threshold, a frequency error threshold, and a position error threshold, wherein at least one of the time error threshold, the frequency error threshhold, and the position error threshold comprises both a low water mark value and a high water mark value;

code for causing the computer to synchronize an internal clock based at least in part on the SPS time data, in response to the SPS time error not exceeding the time error threshold;

code for causing the computer to obtain a frequency reference based at least in part on the SPS frequency data, in response to the SPS frequency error not exceeding the frequency error threshold;

code for causing the computer to estimate a location of the computer based at least in part on the SPS position data, in response to the SPS position error not exceeding the position error threshold;

code for causing the computer to obtain from a second data source at least one of second time data, second frequency data and second position data;

in response to one of the time error, frequent error and position error exceeding the low water mark value, code for causing the computer to perform a first defined action; and in response to one of the time error, frequency error and position error exceeding the high water mark, code for causing the computer to perform a second defined action.

* * * * *